US010728265B2

(12) United States Patent
Hayden et al.

(10) Patent No.: US 10,728,265 B2
(45) Date of Patent: Jul. 28, 2020

(54) CYBER WARNING RECEIVER

(71) Applicant: BAE Systems Information and Electronic Systems Integration Inc., Nashua, NH (US)

(72) Inventors: Patrick M. Hayden, Bow, NH (US); Jeong-O. Jeong, Ashburn, VA (US); Vu T. Le, Chantilly, VA (US); Christopher C. Rappa, Litchfield, NH (US); Sumit Ray, Broadlands, VA (US); Katherine D. Sobolewski, Boston, MA (US); David K. Woolrich, Jr., Brookline, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 323 days.

(21) Appl. No.: 15/624,444

(22) Filed: Jun. 15, 2017

(65) Prior Publication Data
US 2018/0367553 A1    Dec. 20, 2018

(51) Int. Cl.
| | | |
|---|---|---|
| *H04L 29/06* | (2006.01) | |
| *G06N 7/08* | (2006.01) | |
| *G06N 20/10* | (2019.01) | |
| *G06N 7/00* | (2006.01) | |

(Continued)

(52) U.S. Cl.
CPC ........ *H04L 63/1425* (2013.01); *G06F 21/552* (2013.01); *G06N 3/084* (2013.01); *G06N 7/005* (2013.01); *G06N 7/08* (2013.01); *G06N 20/10* (2019.01)

(58) Field of Classification Search
CPC ............. H04L 63/1416; H04L 63/1425; G06F 21/552
See application file for complete search history.

(56) References Cited

U.S. PATENT DOCUMENTS

| 6,769,066 B1 * | 7/2004 | Botros | G06F 21/55 |
| | | | 700/110 |
| 2004/0064735 A1 | 4/2004 | Frazier et al. | |

(Continued)

OTHER PUBLICATIONS

PCT Search Report, PCT/US18/35951, dated Aug. 27, 2018, 7 pages.

*Primary Examiner* — Dao Q Ho
(74) *Attorney, Agent, or Firm* — Finch & Maloney PLLC; Scott J. Asmus

(57) ABSTRACT

Techniques are provided for cyber warning. One technique includes a cyber warning receiver (CWR). The CWR includes a bus sensing circuit to sense traffic on a communications bus over time, an anomaly detecting circuit to detect anomalous behavior in the sensed bus traffic, a data fusing circuit to fuse the detected anomalous behavior into groups having similar characteristics, a decision making circuit to decide if the fused anomalous behavior is normal or abnormal, and a behavior logging circuit to log the detected anomalous behavior on an electronic storage device. In one embodiment, the CWR further includes a behavior alerting circuit to alert an operator to the fused anomalous behavior identified as abnormal. In one embodiment, the communications bus is an embedded communications bus, such as a MIL-STD-1553 bus, and the CWR is a standalone device configured to connect to the MIL-STD-1553 bus as a bus monitor.

16 Claims, 10 Drawing Sheets

(51) Int. Cl.
*G06F 21/55* (2013.01)
*G06N 3/08* (2006.01)

(56) References Cited

U.S. PATENT DOCUMENTS

| | | | |
|---|---|---|---|
| 2007/0056038 A1* | 3/2007 | Lok | H04L 63/1416 726/23 |
| 2015/0020152 A1 | 1/2015 | Litichever et al. | |
| 2015/0113638 A1 | 4/2015 | Valasek et al. | |

* cited by examiner

CYBER WARNING RECEIVER

FIELD OF THE DISCLOSURE

This disclosure relates to a cyber warning receiver.

BACKGROUND

Recent world events demonstrate that no industry is immune to the disruptive effects of cyberattacks. Systems of systems architecture, commonly used in both information systems and defense weapons systems, provides greater opportunity for software vulnerabilities to spread the negative effects of cyberattacks across the system. Abnormal behavior of a system or subsystem is often attributed to faulty equipment or software. Post-mission malfunction analysis traditionally focuses on system functionality rather than determining if a cyber-adversary is responsible for the abnormal behavior. Despite the demonstrated and growing threat of cyberattack against legacy commercial and military platforms, these systems do not presently support passive monitoring, active defense, or forensic data collection capabilities focused on enhancing cyber security. These systems are not well-suited to existing cyber intrusion detection or prevention technologies, due to their prevalent use of communications busses and networks that are not standard within traditional Information Technology (IT) environments. Furthermore, current approaches from the IT industry involving signature-based detection are not suitable for threat mitigation in the highly critical applications served by these platforms. Existing techniques can only identify a threat after it has been initially observed and categorized on another (e.g., compromised) system. Defense against zero-day attacks, which can leverage vulnerabilities, exploits, techniques, and code entirely unknown to the defenders, is crucial to commercial and government security.

BRIEF DESCRIPTION OF THE DRAWINGS

Features of embodiments of the claimed subject matter will become apparent as the following Detailed Description proceeds, and upon reference to the Drawings, wherein like numerals depict like parts.

Figure 1:
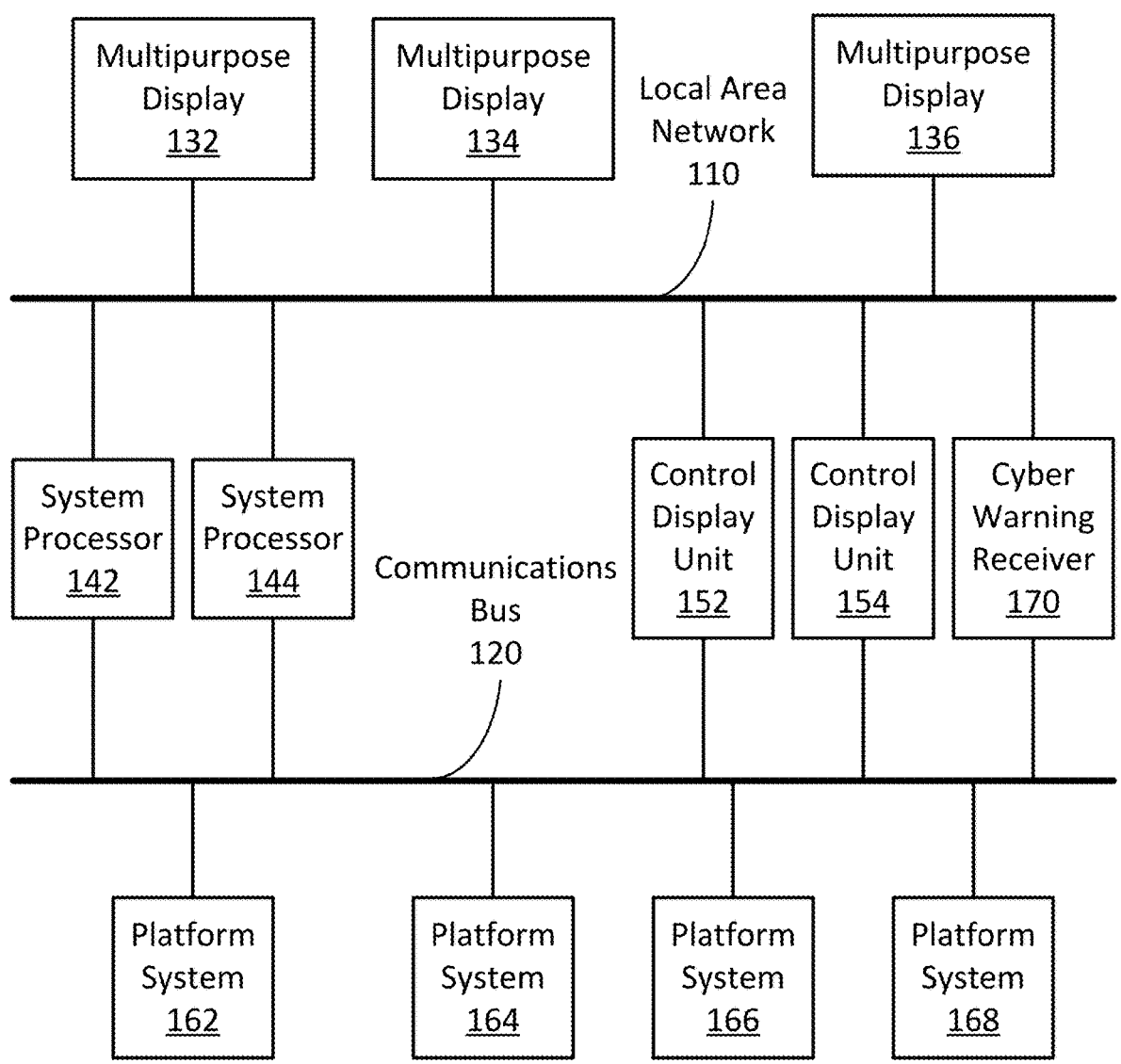
FIG. 1 is a schematic diagram illustrating an example avionics communication system for implementing one or more embodiments of the present disclosure.

Although the following Detailed Description will proceed with reference being made to illustrative embodiments, many alternatives, modifications, and variations thereof will be apparent to those in light of the present disclosure.

DETAILED DESCRIPTION

In one or more embodiments of the present disclosure, defense against zero-day attacks on an embedded bus system is provided for by a cyber warning receiver (CWR) that uses an anomaly-based approach in which attacks reveal themselves through their side effects on the embedded bus. These side effects can include induced deviations from normal application and network behavior on the embedded bus. The anomaly-based approach can use a two-stage decision and classification process. Using machine learning techniques, normal bus traffic can be monitored to train one or more anomaly detectors to identify anomalous bus traffic. Anomalous behavior from these detectors can then be used to train a data fuser that fuses anomalous data sharing similar characteristics (such as being collected at the same time) to identify which of the anomalous behavior is normal and which is abnormal (e.g., possible cyberattack). The fuser can further use anomaly observations from across the various system components to construct a complete anomaly picture of the overall system and characterize an attack. The abnormal data can trigger alerts to operators as well as pinpoint bus traffic of concern for post mission/test analysis. Such CWR techniques secure legacy platforms and systems, rather than focusing on yet-to-be-developed platforms, which is critical to ensuring organizations (such as military organizations) can operate in a cyber-denied environment using their legacy platforms and systems. Such techniques also provide practical and efficient solutions to cyber threats compared to other techniques such as hardening each of the (potentially thousands of) components that make up modern systems and systems of systems.

Other network security techniques are not adapted to operate on the communications networks commonly employed by commercial and defense platforms. Further, other approaches to cyber security do not work as they are signature-based and not suited to protect nontraditional systems of systems. For example, other techniques, using rules-based approaches for detection (such as anti-virus software), would not identify an unknown attack as being malicious since there would not be a rule for it (e.g., a known signature to look for).

Most cyber protection mechanisms in the industry today center on information assurance and signature detection and will not provide adequate protection to, for example, aviation platforms having embedded busses. Methods such as anti-virus software only protect systems against previously known threats, not against zero-day (e.g., first time) attacks. In addition, anti-virus software is not suited to protect the various proprietary and non-standard systems that make up most weapons systems, since these systems do not share components (and, by extension, vulnerabilities) present in open and standard systems to which traditional anti-virus software is directed. Defense against zero-day attacks that can leverage vulnerabilities, exploits, techniques, and code entirely unknown to the defenders can be challenging. Simple anomaly detection, such as checking each component's communications in isolation, usually fails since it produces too many false positives to be a reliable indicator.

Accordingly, in various embodiments of the present disclosure, techniques are provided for cyber warning. One technique includes a cyber warning receiver (CWR). The CWR includes a bus sensing circuit to sense traffic on a communications bus over time, an anomaly detecting circuit to detect anomalous behavior in the sensed bus traffic, a data fusing circuit to fuse the detected anomalous behavior into groups having similar characteristics, a decision making circuit to decide if the fused anomalous behavior is normal or abnormal, and a behavior logging circuit to log the detected anomalous behavior on an electronic storage device. In one embodiment, the CWR further includes a behavior alerting circuit to alert an operator to the fused anomalous behavior identified as abnormal. In one embodiment, the communications bus is an embedded communications bus, such as a MIL-STD-1553 bus, and the CWR is a standalone device configured to connect to the MIL-STD-1553 bus as a bus monitor.

By way of example, in some embodiments, the CWR uses an anomaly-based approach in which attacks reveal themselves through their side effects (i.e., induced deviations from normal application and network behavior). The CWR uses one or more anomaly detectors having deep insight into the processes that they are monitoring, and accurately represent the complex latent variables that influence the observed measurements. The anomaly detector models the observable interactions between the different components and captures a model for the impulse and responses of the system as a whole. Anomalous bus traffic is identified and then run through a data fuser to group similar anomalous bus traffic records together. This grouping can then be used to decide if any particular group is normal (e.g., harmless) or abnormal (e.g., something to be concerned about, such as a cyberattack). The CWR is a line-replaceable unit that provides "bolt-on" security to legacy systems not designed with cyber security requirements. In some embodiments, the CWR unit can be transparently added to a bus (such as an embedded bus) with minimal impact to the legacy system.

In some embodiments, CWR units couple other anomaly detection and data fusion capabilities with the multitude of communications technologies commonly employed by platforms to provide the missing cyber situational awareness. The CWR can monitor platform traffic data from a bus monitor location, ensuring bus traffic is monitored with no interference to the other systems operating on the bus. According to one or more embodiments, during controlled training periods, the CWR characterizes traffic patterns and models the complete range of normal system behaviors. After training, the CWR detects abnormal behavior between systems residing on the platform bus and takes appropriate action, such as alerting an operator of the anomalous behavior as well as logging the behavior for post mission/test analysis. In some embodiments, fusion capabilities aggregate system-wide observations to infer and report the overall system security state. The CWR thus provides situational awareness, active defense, and forensics data for novel attacks, protecting the platform from malicious messages and data being transmitted on the bus.

General Overview

In one or more embodiments, a CWR is adapted to the MIL-STD-1553 ("1553") communications bus architecture (for a serial data bus) commonly used on avionics platforms in the defense industry. However, the present disclosure is not limited thereto. In other embodiments, the CWR is adapted to other architectures, such as MIL-STD-1760 (electrical interface between a military aircraft and its weapons, electronic devices, disposable tanks, and other stores), MIL-STD-1773 (optical fiber bus), Aeronautical Radio, Incorporated (ARINC) standards (such as ARINC 429, directed to an avionics serial bus and corresponding protocol), RS-232 (serial data transmission), RS-485 (serial communications drivers and receivers), and other architectures relevant to both military and commercial platforms. For example, in some embodiments, applications extend beyond avionics networks to include mission networks, control system networks, and the like.

In one or more embodiments, a CWR employs anomaly detection and fusion algorithms to one or more communication networks, including non-traditional communication networks (such as military networks, network architectures no longer used by most computing resources, and the like). In some embodiments, the CWR is implemented as a purpose-built hardware line-replaceable unit, but other embodiments are not so limited. For example, in one or more embodiments, CWR technologies and algorithms may also be incorporated into existing platform hardware (e.g., mission computers, existing bus monitors, to name a few) depending on the application. In some embodiments, a single end-to-end implementation of a CWR is provided. In other embodiments, portions of a communication system incorporating disclosed CWR technology are provided.

Thus, and in accordance with an embodiment, a technique for cyber warning and a CWR using that technique are provided. For ease of description, several embodiments are described herein in terms of an avionics platform, such as a military aviation platform, and using a military standard bus architecture, such as MIL-STD-1553, for an embedded bus architecture supporting the avionics platform. However, the present disclosure is not limited thereto, and in other embodiments, cyber warning techniques and CWRs are provided for use in other military or civilian equipment and communication architectures. The CWR has the ability to detect cyberattacks or detect developing cyberattacks. Such a CWR can be located, for example, on communication busses connected to weapon systems and can provide real-time and post-mission situational awareness, increasing the cyber resiliency of these platforms.

In some embodiments, the CWR includes anomaly detecting sensors. Such sensors may be machine learning sensors (such as neural network sensors), trained on real (e.g., uncompromised) bus traffic to look for characteristics of normal bus traffic. Each sensor may look for different types of data that is inconsistent with known normal bus traffic. Bus traffic identified as anomalous by the anomaly detecting sensors can be input to a data fusing engine to fuse anomalous data events from the different sensors (e.g., that share the same time). The fused data can be identified by the data fusing engine as normal (e.g., falling into patterns of earlier observed anomalous data, so likely harmless) or abnormal (e.g., not observed earlier, so likely to be of concern, such as a cyberattack). Today's weapon systems can benefit from the ability to both detect cyberattacks in real time and allow for post-mission system cyberattack analysis. Knowing when and how a system is experiencing cyberattacks informs the next steps required for persistent cyber defense of military weapons systems. In one or more embodiments, a CWR located on aviation platforms (manned or unmanned) provides real-time cyberattack notification (such as alerting an operator of abnormal bus traffic) and the ability to conduct post mission cyber analysis.

Such a CWR performs important functions, such as alerting operators of cyberattacks or developing cyberattacks against avionics weapon systems, and allowing cyber-relevant post-mission analysis of systems through logging anomalous behavior between systems. Such a CWR can have a targeted deployment, such as to systems of highest risk or most importance (in consideration of the supported platforms), and distributed in an efficient manner to improve or optimize available coverage. Such a CWR uses an anomaly detector to detect anomalous behavior on a communications bus. The anomaly detector is trained, such as with artificial intelligence techniques, to detect anomalous bus traffic on the communications bus. For example, the anomaly detector can be trained, using normal bus traffic, to identify patterns and characteristics present in normal bus traffic. The trained anomaly detector can then have its output fused (e.g., by a data fuser) into groups of anomalous events sharing similar characteristics, where the data fuser can identify each group as normal (e.g., not a concern) or abnormal (e.g., likely a concern). Such a CWR also has cyber resiliency, such as the ability to ward off cyberattacks directed at the CWR itself.

Architecture and Methodology

Figure 2:
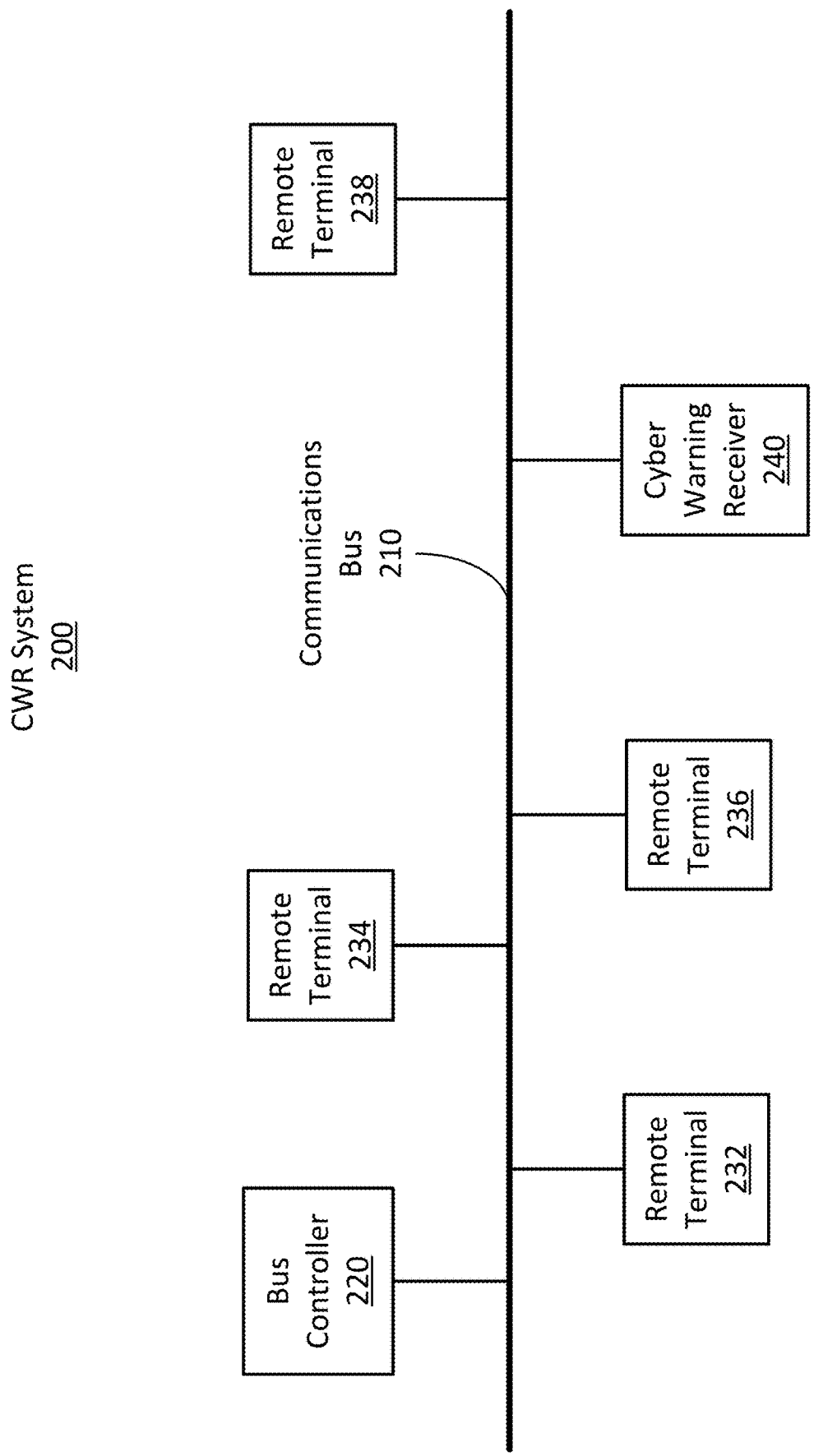
FIG. 2 is a schematic diagram illustrating an example cyber warning receiver (CWR) system for detecting and logging anomalous bus traffic, according to an embodiment of the present disclosure.
Figure 3:
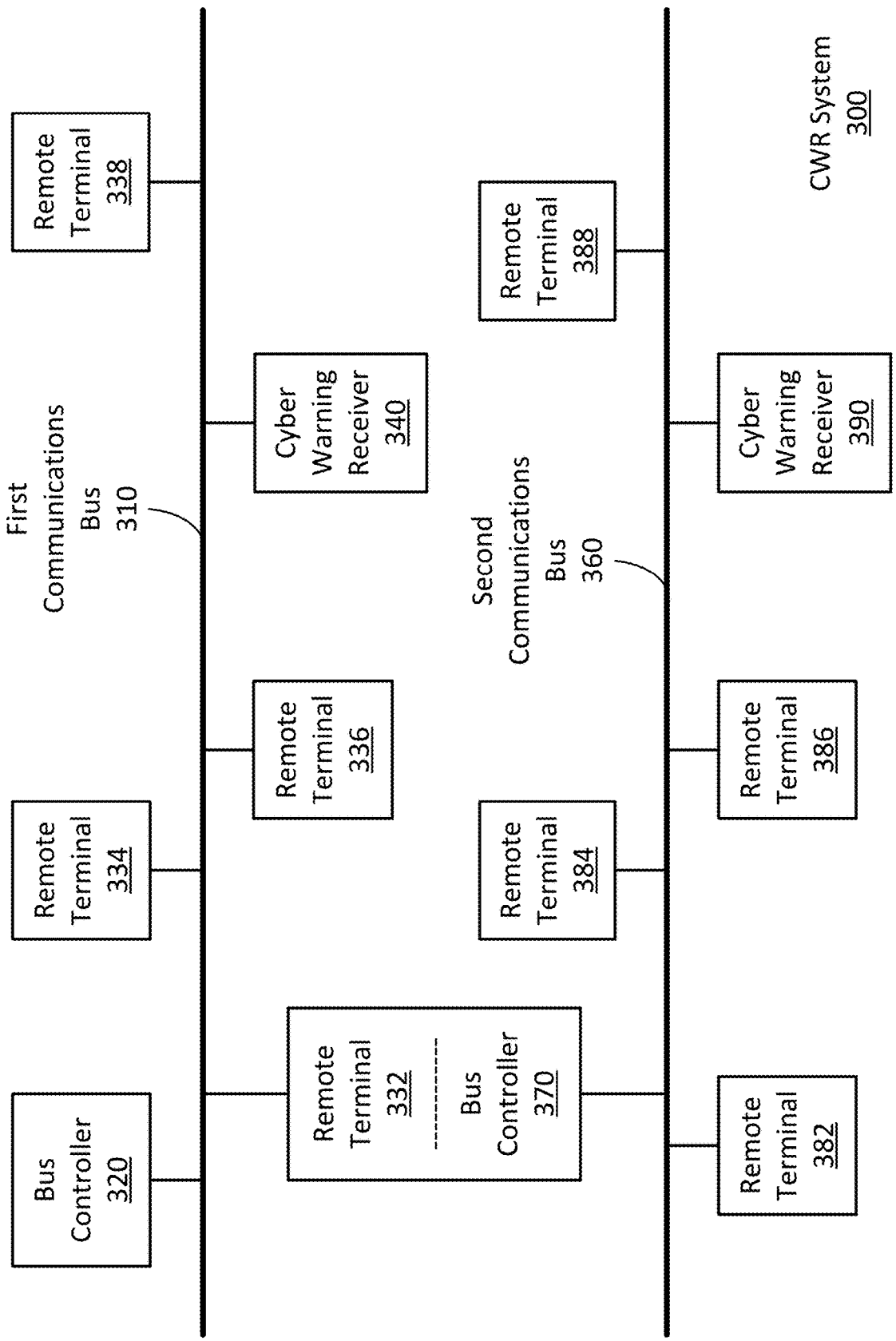
FIG. 3 is a schematic diagram illustrating an example cyber warning receiver (CWR) system for detecting and logging anomalous bus traffic, according to another embodiment of the present disclosure.
Figure 4:
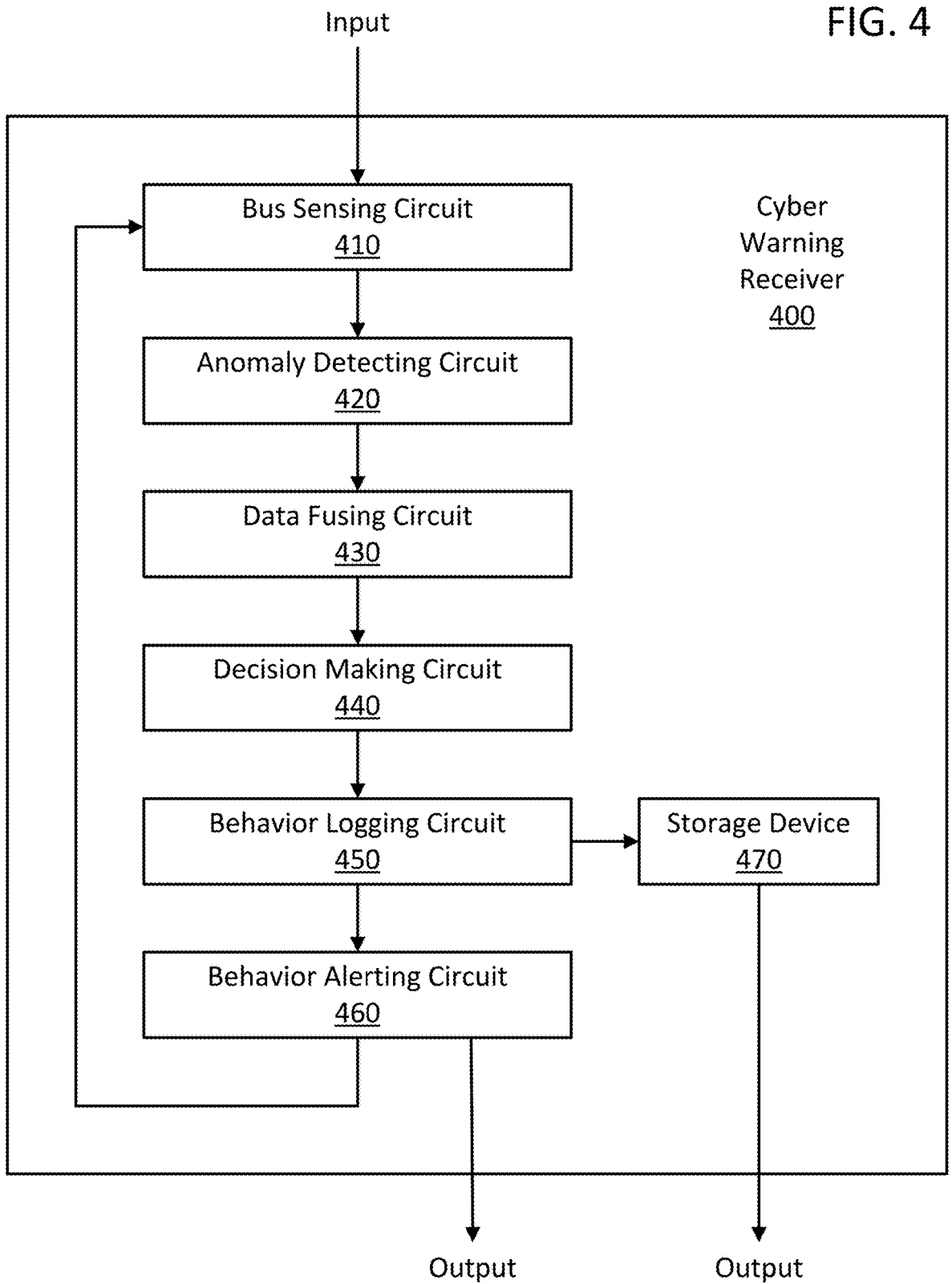
FIG. 4 is a block diagram of an example CWR, according to an embodiment of the present disclosure.
Figure 5:
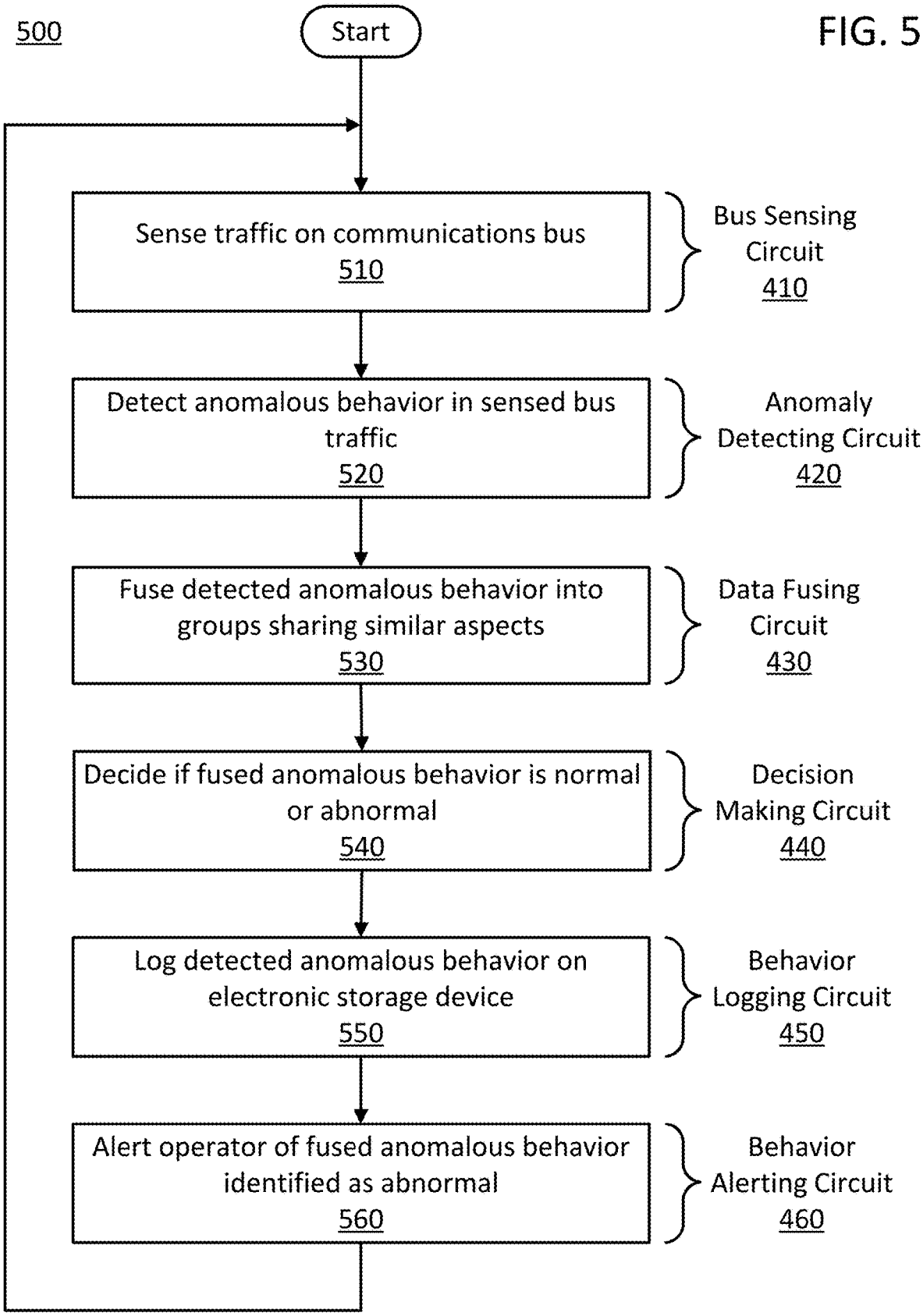
FIG. 5 is a flowchart illustrating an example computer-based method of cyber warning, according to an embodiment of the present disclosure.

FIG. 1 is a schematic diagram illustrating an example avionics communication system 100 for implementing one or more embodiments of the present disclosure. FIG. 2 is a schematic diagram illustrating an example cyber warning receiver (CWR) system 200 for detecting and logging anomalous bus traffic behavior, according to an embodiment of the present disclosure. FIG. 3 is a schematic diagram illustrating an example cyber warning receiver (CWR) system for detecting and logging anomalous bus traffic, according to another embodiment of the present disclosure. FIG. 4 is a block diagram of an example CWR 400, according to an embodiment of the present disclosure. FIG. 5 is a flowchart illustrating an example computer-based method 500 of cyber warning, according to an embodiment of the present disclosure. The method 500 and other methods described herein may be implemented in hardware or software, or some combination of the two. For example, the method 500 may be implemented by the CWR 400 of FIG. 4. In another embodiment, the method 500 may be implemented be a custom circuit such as a field programmable gate array (FPGA) configured to carry out the method 500.

In some other embodiments, the method 500 may be implemented as a series of computer instructions, such as software, firmware, or a combination of the two, together with one or more computer processors (e.g., one or more microprocessors). The instructions, when executed on a given processor, cause the method 500 to be performed. For example, in one or more embodiments, a computer program product is provided. The computer program product includes one or more non-transitory machine-readable mediums (such as a compact disc, a DVD, a solid-state drive, a hard drive, RAM, ROM, on-chip processor cache, or the like) encoded with instructions that when executed by one or more processors cause the method 500 (or other method described herein) to be carried out for cyber warning. In addition, while the methods described herein may appear to have a certain order to their operations, other embodiments may not be so limited. Accordingly, the order of the operations can be varied between embodiments, as would be apparent in light of this disclosure.

In a similar light, the CWR 400 and other circuits disclosed herein may be custom hardware circuits or general-purpose computer hardware configured (e.g., through software, firmware, customized logic, to name a few) to carry out the tasks assigned to the circuit. While circuits are illustrated as being made up of other circuits by function, in other embodiments, two or more circuits may be combined into a single circuit performing the functionality of the two or more circuits. In still other embodiments, a single circuit can be divided into two or more circuits, each performing separate functions performed by the single circuit.

Referring to FIG. 1, the communication system 100 includes a local area network (LAN) 110, such as an Ethernet, and a communications bus 120, such as an embedded bus as in a MIL-STD-1553 network bus. The LAN 110 can be an avionics systems LAN for communicating among and between components of the communication system 100, such as with the multipurpose displays 132, 134, and 136. The multipurpose displays 132, 134, and 136 can serve as interfaces between the operators of the avionics (such as the flight crew on an aircraft) and the computers, weapons (or other platform) systems, and the like, that are controlled by the avionics. The communication system 100 further includes system processors 142 and 144, which can process data from the various instrumentation, weapons, and other platforms that make up the avionics and convert the processed data into images (such as 2-D or 3-D images) for display on the multipurpose displays 132, 134, and 136. It should be noted that the number and types of components that make up the communication system 100 can vary between embodiments, and the number and type illustrated in FIG. 1 is but one example. Other embodiments are not so limited, as would be apparent in light of the present disclosure.

The communication system 100 further includes control display units 152 and 154, which can manage the various displays, communications, weapons, instrumentation, and other platforms of the avionics vehicle (e.g., a helicopter). For example, the display units 152 and 154 can serve as data bus controllers for a MIL-STD-1553 serial bus architecture (which the communications bus 120 may comply with), with display unit 152 being the primary data bus controller and display unit 154 being a backup data bus controller. The communications bus 120 can be a 1553 serial bus, such as a MIL-STD-1553B bus. In some embodiments, the communications bus 120 is two or more busses, for example, to provide redundancy in case of damage or failure to one or more of the busses. The communication system 100 further includes platform systems 162, 164, 166. and 168 to control weapons and other platforms of the avionics vehicle. These platform systems 162, 164, 166, and 168 communicate through the communications bus 120 (such as a 1553 serial data bus). The communication system 100 also includes a CWR 170 for sensing traffic on the communications bus 120, detecting anomalous behavior in the sensed traffic, fusing the detected anomalous behavior into groups of anomalous events sharing similar characteristics, logging the detected anomalous behavior on a data storage device (such as a disk drive or a solid-state drive), and alerting an operator if the fused anomalous data appears to be abnormal (such as a possible cyberattack). The data storage device may be part of the CWR 170, or may be accessible to the CWR 170, for example, at one of the system processors 142 or 144 through the communications bus 120, or through the local area network 110.

Referring to FIG. 2, the CWR system 200 includes a communications bus 210 (such as a serial data bus configured to be driven according to the MIL-STD-1553 architecture), a bus controller 220 for controlling communications transmitted along the communications bus 210 according to an agreed-upon protocol (such as 1553), remote terminals 232, 234, 236, and 238 for performing various functions related to the avionics platform (such as weapons, other stores, or instrumentation control), and a CWR 240 for sensing communication or other traffic on the communications bus 210, detecting anomalous behavior among the traffic, fusing the detected anomalous behavior into groups of similar events, logging the detected anomalous behavior on an electronic data storage device, and alerting an operator if any of the fused groups have abnormal data (e.g., data with which to be concerned).

One of the remote terminals (such as remote terminal 234 may be compromised), and doing unusual (e.g., anomalous) communications on the communications bus 210. Accordingly, the CWR 240 detects the anomalous behavior, classifies it as abnormal, and logs the detected behavior (such as a copy of the communication and a source of the communication, in this case remote terminal 234) on a data storage device, such as a flash drive that is part of the CWR 240. For cyber resiliency, the CWR 240 may only be configured to monitor or sense the message traffic on the communications bus 210, and not receive messages or other forms of potential electronic control via the communications bus 210. As such, even though the remote terminal 234 may be compromised, it will be impossible for the compromised remote terminal 234 to take control of the CWR 240 or prevent the CWR 240 from fulfilling its mission of detecting and logging anomalous behavior on the communications bus 210.

Referring to FIG. 3, the CWR system 300 is similar to the CWR system 200 of FIG. 2, however, the CWR system 300 includes two communications busses, namely a first communications bus 310 and a second communications bus 360 (such as serial data busses configured to be driven according to the MIL-STD-1553 architecture) on the same avionics platform. The first communications bus 310 is connected to a bus controller 320, remote terminals 332, 334, 336, and 338, and CWR 340, while the second communications bus 360 is connected to a bus controller 370, remote terminals 382, 384, 386, and 388, and CWR 390. For example, there may be more subsystems (and hence, remote terminals) than can be supported by one communications bus within the avionics platform, so multiple communications busses are needed to communicate and control the various systems. In the CWR system 300 of FIG. 3, one component (e.g., computer, control display unit, or the like) is shared between the two communications busses 310 and 360, and serves as the bus controller 370 for the second communications bus 360 and the remote terminal 332 for the first communications 310. As such, the bus controller 370 can act as a bridge between the two communications busses 310 and 360. Each communications bus has its own CWR (e.g., CWR 340 or CWR 390) for monitoring bus traffic on its corresponding communications bus. In other embodiments, there can be three or more such communications busses and corresponding controllers, remote terminals, and CWRs, all part of a larger CWR system.

One of the remote terminals (such as remote terminal 234 may be compromised), and doing unusual (e.g., anomalous) communications on the communications bus 210. Accordingly, the CWR 240 detects the anomalous behavior, classifies it as abnormal, and logs the detected behavior (such as a copy of the communication and a source of the communication, in this case remote terminal 234) on a data storage device, such as a flash drive that is part of the CWR 240. For cyber resiliency, the CWR 240 may only be configured to monitor or sense the message traffic on the communications bus 210, and not receive messages or other forms of potential electronic control via the communications bus 210. As such, even though the remote terminal 234 may be compromised, it will be impossible for the compromised remote terminal 234 to take control of the CWR 240 or prevent the CWR 240 from fulfilling its mission of detecting and logging anomalous behavior on the communications bus 210.

Referring to FIG. 4, the CWR 400 receives as input the bus traffic (such as message traffic) from a communications bus (such as a 1553 bus). For example, the CWR 400 may act as a communications bus monitor for monitoring the traffic on the 1553 bus. More specifically, the CWR 400 may be a custom (such as purpose-built) circuit like a field-programmable gate array (FPGA). In other embodiments, the CWR 400 may be a processor or other computational circuit configured to execute code (such as software or firmware) to carry out the functions of a CWR technique according to one or more embodiments of the present disclosure. The monitored bus traffic is sensed by a bus sensing circuit 410, which groups the traffic into different messages and sends the messages to an anomaly detecting circuit 420. The anomaly detecting circuit 420 detects anomalous behavior in the sensed bus traffic (e.g., by comparing the sensed traffic to normal traffic to see if the sensed traffic is close enough to normal traffic that the sensed traffic is unlikely to be a cyberattack). The anomaly detecting circuit 420 may include a plurality of anomaly detectors, each sensing for different anomalous behavior in the messages.

For example, in some embodiments, the anomaly detecting circuit 420 is a neural network that has been configured (e.g., trained) to recognize normal bus traffic emanating from components of the avionics platform. For instance, the neural network can be trained to identify features or characteristics of normal communications on the communication bus for the particular avionics platform to which the neural network is being trained. Accordingly, when presented with new bus traffic that does not resemble (e.g., does not share the features or characteristics of) the known normal communications, the anomaly detecting circuit 420 detects the new bus traffic as exhibiting anomalous behavior. In other embodiments, different machine learning structures (for example, support vector machines) are used to perform the anomaly detection. In some embodiments, the anomaly detecting circuit 420 includes numerous (e.g., four) anomaly detectors, each operating independently and sensing different types of anomalies (e.g., anomalies from different network layers, or from different applications, and the like). Further details of the anomaly detecting circuit 420 and anomalous behavior detection are discussed below.

The anomaly detecting circuit 420 may generate a significant amount of data. For example, it can be quite challenging to subject an avionics platform to all of the possible use scenarios during testing of the platform (and corresponding training of the anomaly detection algorithm used in the anomaly detecting circuit 420). As such, the anomaly detection may continue to identify behavior as anomalous after training, even though the detected anomalies are in fact normal behavior, and could be recognized as such (and a corresponding circuit trained to recognize them as such) if the detected anomalies were grouped into sets having similar characteristics. Accordingly, in some embodiments, the CWR 400 also includes a data fusing circuit 430 to fuse the separate anomalies detected by the anomaly detecting circuit 420 into groups. For example, one such group is the same anomaly occurring at different times (e.g., repeated anomalous behavior). Another such group is different anomalies occurring at the same time (e.g., one instance of anomalous behavior triggering numerous detectable side effects). Still another such group is multiple different anomalous behaviors observed to originate at a single compromised host over a period of time.

In addition, in some embodiments, the CWR further includes a decision making circuit 440 to further classify the different groups by likelihood of being a cyberattack, such as being normal (not likely a cyberattack) or abnormal (likely a cyberattack, or at least bus traffic to be concerned about). For example, frequent and unusual communication bus requests may be signs of, for example, a lurking cyberattack sensing when an opportune time to strike presents itself (and thus be abnormal bus requests). On the other hand, sporadic or onetime anomalies may be more symptomatic of a harmless glitch (and thus be normal bus requests, albeit anomalous when considered in isolation). Cyberattacks are not normal operation, so their actions create multiple events that do not resemble normal behavior and, in addition, such attacks share particular features in their corresponding bus traffic. The decision making circuit 440 thus distills much of the anomalous behavior into those particular events that are most likely to be of concern (e.g., abnormal bus traffic), including events that turn out to be normal behavior but for which the anomaly detecting circuit 420 is inadequately trained to identify as such.

The decision making circuit 440 can be, for example, another neural network or other machine learning structure that sits on top of the anomaly detecting circuit 420. The data fusing circuit 430 can group instances of anomalous behavior detected by the anomaly detecting circuit 420 into collections or patterns of instances that share common characteristics (such as common temporal or behavioral characteristics). If the platform is assumed to be uncompromised, then the groups of anomalous bus traffic can be assumed to actually be normal, even though the anomaly detecting circuit 420 may not be trainable to recognize them as such. For example, at the individual message level, such anomalous bus traffic may always appear as unencountered and thus, anomalous, while at the data fusion level, they may possess common characteristics that can be used to identify them as harmless (e.g., normal). As such, in some embodiments, the decision making circuit 440 is trained at a higher level, using the anomalous bus traffic output by the anomaly detecting circuit 420 (and as fused by the data fusing circuit 430) as input to train the decision making circuit 440 to recognize patterns in the anomalous bus traffic that are likely harmless (e.g., normal).

In some embodiments, the decision making circuit 440 is an expert-coded model of anomalous behavior characterization. Using known patterns of benign, yet still anomalous, behavior, and perhaps known patterns of concerning (and possibly cyberattack) behavior, an expert could program the decision making circuit 440 to classify the patterns of anomalous bus traffic identified by the anomaly detecting circuit 420 (and fused by the data fusing circuit 430) as either harmless or concerning (e.g., worthy of alerting the operator of the avionics platform or specially identifying for post mission/test analysis by an expert as a possible cyberattack). In some embodiments, the decision making circuit 440 uses a partially observable Markov decision process to integrate the fused outputs of multiple anomaly detectors to improve confidence before notifying or alerting operators of potential cyberattacks.

The behavior logging circuit 450 then logs any of this detected anomalous behavior (for example, the identity of the remote terminal transmitting the anomalous bus traffic, some or all of the detected bus traffic, and the like) on an electronic storage device 470, such as magnetic, optical, or solid-state drive. For instance, the logged data may be grouped into similar events as identified by the data fusing circuit 430. From there, the detected anomalous behavior can be output to, for example, analysts or other analyzing tools for further analysis and follow-up activities, or for later retraining of the anomaly detecting circuit 420. While the CWR 400 shows the storage device 470 as being part of the CWR 400, other embodiments may not be so limited. For example, in some embodiments, the storage device 470 may be part of another component or may be accessible from the communications bus, such as part of a processing unit connected to the communications bus.

In some embodiments, the detected anomalous behavior is output by groups as fused by the data fusing circuit 430. In this manner, a group of detected anomalous bus traffic messages identified by the decision making circuit 440 as concerning (e.g., abnormal, or not possessing a previously identified pattern characteristic of harmless, though nonetheless anomalous, bus traffic), can be specially identified in the logged output of the behavior logging circuit 450. Such concerning group traffic could later be identified (or presumed) harmless (possibly by an expert) and possibly used to retrain the decision making circuit 440.

In addition, the behavior alerting circuit 460 can alert an operator (such as an operator of the avionics platform) of the detected anomalous behavior, particularly if the decision making circuit 440 has identified the anomalous behavior as having a high likelihood of being a cyberattack (e.g., abnormal). For example, the behavior alerting circuit 460 can send a message (such as along the communication bus, or as a wireless communication), activate an audible or visual indicator (such as a beep or light), or the like, to an operator of the platform being protected by the CWR 400.

In some embodiments, the data fusing circuit 430 and decision making circuit 440 use a sensor fusion and decision-making framework for network traffic monitoring. For example, the data fusing circuit 430 may fuse the anomalies detected by four different anomaly detectors into groups having related anomalies (e.g., similar symptoms, similar times, to name a few). In some embodiments, the anomaly detecting circuit 420 uses numerous (e.g., hundreds or thousands of) distinct anomaly detection sensors for network traffic, each sensing a different anomaly or set of anomalies. In some embodiments, the data fusing circuit 430 and decision making circuit 440 use a sensor fusion and response framework that combines asynchronous multi-channel sensor reporting with continuous learning and autonomic response via a partially observable Markov decision process. This allows the anomaly detecting circuit 420, data fusing circuit 430, and decision making circuit 440 to handle high-speed network traffic anomaly detection and decision making, and to present useful and timely alerts to operators of the platform while logging useful information for post mission/test analysis.

In one or more embodiments, the anomaly detecting circuit 420 applies a joint probability distribution over the observable space of traffic generated by system component interactions. These include, but are not limited to, frequency, rate, volume, and content of messages exchanged over a common bus. In order to avoid making incorrect assumptions about the parametric form of these distributions, in some embodiments, non-parametric learning via kernel density estimation (KDE) is used to train the anomaly detecting circuit 420. Then when presented with new observations, the CWR 400 identifies anomalous communication patterns and, using prior observations, calculates the marginal distribution to estimate the expected response given the impulse. This method is a non-parametric method, such as one where there are no a priori assumptions about the structure of underlying stochastic process (e.g., Gaussian, multinomial, Bernoulli, or the like). Instead, in one or more embodiments, for each sample, the joint probability is estimated based on its "proximity" to other previously observed samples. In some embodiments, the anomaly detecting circuit 420, in conjunction with the data fusing circuit 430 and decision making circuit 440, will yield detection artifacts that provide human-readable policy language, which allows for post-mission cyber analysis.

Referring to the method 500 of FIG. 5, processing begins with sensing 510 traffic on a communications bus (e.g., a 1553 bus). This may be performed, for example, using the bus sensing circuit 410 of FIG. 4. Processing continues with detecting 520 anomalous behavior in the sensed bus traffic. This detecting 520 may be performed, for example, by the anomaly detecting circuit 420 of FIG. 4. The detecting 520 may be carried out by multiple anomaly detectors, each trained to detect a different type (or types) of anomalous behavior. Once detected, processing continues with fusing 530 the detected anomalous behavior into groups sharing similar aspects (e.g., temporal coincidence, similar side effects being observed, and the like). For example, when there are multiple anomaly detectors, the fusing 530 can include grouping the anomalous bus traffic by time (to see, for example, if similar events lead to similar sets of anomalies being detected across multiple detectors), or by type (to see, for example, if similar anomalies are being detected over time, which could be symptomatic of a cyberattack doing repeated anomalous behavior), or some other such criteria. The fusing 530 may be performed, for example, by the data fusing circuit 430 of FIG. 4.

Once detected and fused, processing continues with deciding 540 if the fused anomalous behavior is normal or abnormal. In one embodiment, the deciding 540 is performed using a partially observable Markov decision process. The deciding 540 may be performed, for example, by the decision making circuit 440 of FIG. 4. The method 500 further includes logging 550 the detected anomalous behavior on an electronic storage device (such as the storage device 470). Such logging 550 may include information such as the sending or (intended) receiving device of the anomalous bus message. In some embodiments, other fields used in the communication protocol for the bus are included in the logged data. Further, in some embodiments, the body of the anomalous bus message is included in the logged data. The logging 550 may be performed, for example, by the behavior logging circuit 450 of FIG. 4. In addition, processing continues with alerting 560 an operator of the fused anomalous behavior identified as being abnormal. The alerting 560 can take on one or more of various forms, such as an audible signal or alarm, a message (data bus communication, e-mail, text, or the like), a visible signal (such as a light), to name a few. The alerting 560 may be performed, for example, by the behavior alerting circuit 460 of FIG. 4.

For a CWR to provide cyber protection to, for example, aviation platforms, in one or more embodiments, the CWR itself is resilient to cyberattacks. The presence of a CWR on a weapon system could attract the attention of a cyber-adversary making it a potential target. For example, the CWR could be implemented with a secure operating system and hardware design. This CWR can, for example, stop the most well-known types of cyberattack, such as buffer overflows, code injections, and others. The CWR can also implement a root-of-trust in hardware at the instruction level that cannot be subverted by malicious or poorly written code. For example, in one embodiment, the root-of-trust for CWR associates each piece of data in the system with a metadata tag describing its provenance or purpose (e.g., "this is an instruction," "this came from the network"). In addition, the CWR can propagate metadata as instructions are executed and check that policy rules compliance takes place throughout the computation.

The CWR can also exercise great flexibility for enforcing foundational security policies, without arbitrary limitations on the size of the metadata and the number of policies supported. According to an embodiment, hardware extensions in the CWR enforce memory safety, control flow integrity, and taint tracking. This helps secure the CWR by creating a near insurmountable level of effort for cyber attackers to subvert.

According to some embodiments, the CWR is a standalone line-replaceable unit, monitoring bus traffic (such as 1553 bus traffic) from a location (such as a bus monitor location) attached to the communication bus, and without interference to the other terminals or devices attached to communication bus. From the bus monitor location, the CWR can detect abnormal behavior between other systems connected to the 1553 bus, alerting an operator when anomalous behavior is detected as well as logging that behavior for post mission/test analysis.

Anomalous Behavior Detection and Data Fusion

Further details of the anomalous behavior detection and data fusion will now be presented. For ease of description, they will be described with respect to the 1553 serial bus architecture, though the concepts are applicable to other bus architectures and other communication networks as will be apparent in light of the present disclosure. The MIL-STD-1553 network is a serial messaging interface having a physical layer and a data link protocol for exchanges of data (e.g., messages) between two or terminals connected to a communication bus. The physical network topology can be thought of as flat. (e.g., all terminals are connected to and sensing the same bus signals). At least one of the terminals serves as a bus controller. There can be multiple bus controllers, with one of them acting as the bus controller and the others serving as backups when the bus controller is no longer able to perform the bus controller services. The remaining terminals in the 1553 architecture include remote terminals (which are associated with corresponding subsystems in the avionics platform) and bus monitors (which monitor traffic on the communications bus but otherwise do not interfere with the communications bus or 1553 protocol. Remote terminals communicate (through messages) with each other and with the bus controller.

The attack types available to a cyber-attacker trying to exploit the 1553 network depend on the specific foothold they achieve on the avionics platform, but in general include: attacker present on one or more systems outside the 1553 network but leveraging the data sent or received via the 1553 network, attacker present on a remote terminal connected to the 1553 network, attacker present on a bus controller for the 1553 network, and attacker present at multiple combinations of these footholds. Given these set of footholds, some of the possible cyberattack types include: methods by which a compromised bus controller impacts the system, methods by which a compromised remote terminal impacts the system, methods by which any compromised component connected to the network impacts the system, attacks that violate the 1553 standard or application layer, and attacks where a compromised bus controller or remote terminal sends incorrect data to another bus controller or remote terminal.

Bus controllers have a great degree of control over a 1553 network. A compromised bus controller enables a high degree of control by the cyber-attacker, such as enabling the attacker to initiate new messages, remove existing messages, or intercept and modify data in transit between remote terminals. Compromised remote terminals, on the other hand, can disrupt the network by, for example, initiating new messages on the 1553 bus without coordination by the bus controller, impersonating a different remote terminal, or even attempting to become the bus controller. A compromised bus controller or remote terminal on the 1553 network could deny messaging between other remote terminals. Attacks can also violate the basic rules and conventions of the 1553 standard, or the application layer data they contain. Cyberattacks can also involve a compromised bus controller or remote terminal that deliberately sends incorrect data to another bus controller or remote terminal as part of the normal data exchange cycle. This can include, for example, measurement data, control commands, system status, or other types of information.

An example 1553 network can be modeled to contain four layers, from highest to lowest: application layer, transport layer, data link layer, and physical layer. The data link (e.g., word and message protocols) layer and physical (e.g., hardware components and signal encoding) layer are formally defined in the MIL-STD-1553. The higher layers, namely the application (e.g., bus connector and remote terminal protocols and interface methods) layer and transport (e.g., message packets, sequencing, and rates) layer are logical layers and left up to the avionics system designer to define (e.g., including concepts such as message frequencies and physical bus patterns). Each layer has its own characteristics that can be monitored or observed, with the lowest layers (data link and physical) being the most consistent between different 1553 implementations and the highest layers (application and transport) being the most customized for specific 1553 implementations. For example, the lowest layers, because of their relative simplicity and preciseness of states (e.g., allowable commands) can be amenable to expert-coded detection, to explicitly check for invalid states or commands. Significantly more challenging, however, are the higher layers, whose behavior can seemingly follow all the rules yet be malicious in intent, such as a cyberattack.

Accordingly, as the cyberattacks described above take place on a 1553 network, they produce side effects that are observable to a high-fidelity bus monitor. For the purpose of organizing these observable side effects, the 1553 network can be considered as including the four layers described above, the lowest being the physical layer, the next lowest being the data link layer, followed by the transport layer, and the highest layer being the application layer. The bottommost layer is the physical layer, which is responsible for environmental compliance (e.g., concepts such as voltages, frequencies, signal to noise ratio (SNR), synchronization, and parity). The physical layer contains observables relating to the fundamental electrical environment necessary for proper operation of the 1553 network. Certain cyberattacks can cause disturbances at this level, especially in cases where misuse of the 1553 bus causes message collisions.

The next layer up is the data link layer, which is responsible for 1553 standard compliance (e.g., message protocol concepts such as word presence, word sequence, response timing, valid remote terminal and subaddress numbers, and field agreement (such as length, command, and status)). The data link layer covers low-level implementation details of the 1553 protocol. At this level, for example, it can be detected that valid hosts and subaddresses are present, and that the expected message structure is intact, including the allowed message types and expected word sequences. Some cyberattack types can cause changes to this ordering or produce multiple repeated copies of certain message words. On a normal (e.g., uncompromised) system, typical request and response timings for 1553 transactions can be monitored at this level to provide examples of normal bus traffic at this layer.

The next level up is the transport layer, which is responsible for schedule compliance (e.g., concepts such as valid message set, rates, and sequencing, retry, redundancy behaviors, and asynchronous message management). The transport layer defines platform-specific attributes relating to the use of 1553, such as number and length of message packets. Messages that occur on 1553 can be uniquely identified by attributes including their type, source, destination, and length. At this layer, it can be verified that the system is using the set of messages expected to occur as part of the defined schedule, with the appropriate sequence and timing. The CWR can account for changes to this schedule that may result from different operating modes for the platform. At this level, it is possible to enforce that retransmit or redundancy features spreading messages across multiple busses are performing as expected without misuse.

The top level is the application layer, which is responsible for application compliance (e.g., concepts such as message structure, data range and correlation, and derivative range and correlation). Details at the application layer are specific to the individual systems (e.g., subsystems, applications, weapons systems, and other devices) regarding their use of the serial data bus and their implementations. For example, a navigation device may transmit one type of data using message formats and data representations established by its developers, while a threat-warning system may use a completely different representation for its data. Detection of valid structure (for the corresponding application) is one useful observable. Where data fields are specified or can be otherwise identified, a set of normal behaviors can be observed based on their values. For example, data may be known to have a limited range of values, to exhibit a known distribution, or to have a limited rate at which it can change. In other cases, multiple data fields might exhibit correlations, such as always moving together, or negating one another. Such data can be used to train an anomaly detecting circuit through machine learning techniques (e.g., a neural network). Performance outside of these norms can be indicators of a cyberattack.

A Cyber Warning Receiver (CWR) operates by monitoring traffic and discovering anomalies in the behavior of these observations and measurements. In one or more embodiments, example behavior (e.g., "normal" behavior) for a target platform of interest can be characterized based on a set of measurements performed on an uncompromised system under normal circumstances, such as an avionics platform having 1553 network specifications and specific inputs. Examples of specific inputs include valid remote terminal and subaddress ranges in use, message schedules in each of the different operating modes, and observations from collections of real world data.

In general, the higher the network layer at which observations are collected and characterization is desired, the more specified a solution is to a particular attack, and the more data that should be collected to establish normal behavior and to detect anomalies. By establishing normal behavior through collected observations, observable side effects of cyberattacks (and that are agnostic to specific attack implementation details) can be leveraged to enable detection of attacks that have not been observed before (or preconceived) by defenders. For lower network layers, the number of possible attack approaches is limited, making it tractable for subject matter experts (SMEs) to explicitly define a spanning set of detectors. At these lower levels, detectors are also more portable than for higher levels. This simplifies the task of implementing cyber threat detection across platforms. However, although there are many advantages to monitoring the 1553 bus at lower levels, observations derived from these layers are not sufficient by themselves. There are important classes of cyberattacks that do not produce observable impacts at these layers. For example, manipulation of data from a given device would only be observable by changes in the platform-specific messages that exist in the application layer, as would violation of application layer message formatting. To characterize these forms of cyberattack via the application layer, and to be able detect them on-the-fly, more sophisticated anomaly detectors should be used.

Because of reasons such as the sheer volume of data relationships that exist for all systems and messages across a complete platform (such as a 1553 defense platform), all the specifics of the application layer message formats and field locations for dozens of devices and hundreds of unique messages, and the discovery of subtle or secondary correlations that might escape the intuitions of human cyber defense experts and therefore remain open to exploitation by malicious parties, the anomaly detector should be created through automated techniques. For example, a CWR can be trained, such as through machine learning, to recognize how a system should behave under normal operating conditions, and how this behavior would manifest in the various observable measurements described above. Advances in machine learning provide this capability, and address the challenges identified above. Powerful parameter estimation and model structure detection techniques from machine learning are beneficial for system identification. These capabilities help address the breadth of anomaly detection instances required to form a robust monitoring solution. Activity outside that expected by the normal behavior models would be considered anomalous and become a data point for cyberattack investigation.

Modern machine learning approaches incorporate feature engineering and credit assignment as key elements. Deep machine learning techniques, for example, combine input observations (e.g., values in each 1553 message data field) into more abstract aggregate features that, while no longer representing actual physical measurements, provide an excellent basis for making decisions (e.g., normal behavior or not). Machine learning can automatically select which learned features contribute to making such decisions and which are essentially irrelevant, and assign weights or credit to the various features accordingly. For example, over and above increasing the predictive power of the learned normalcy models, these characteristics of appropriate machine learning approaches obviate the challenge of identifying the most important data fields within the 1553 application layer. This can provide a huge benefit over manually specifying the data fields and their relative importance. Manual specification is cumbersome, especially considering that application layer message definitions may not exist in one place, but may be scattered across multiple disparate interface description documents, each utilizing different formats, which making them poorly suited to automated parsing.

Machine learning enables reasoning over much larger volumes of data than would be possible for a human expert alone. Anomaly detectors increase the visible range of subtle interactions and mutual patterns of behavior exhibited by disparate elements on the 1553 bus. These patterns may seem innocuous to cyber defense experts trying to envision attack vectors. However, these are exactly the oversights that inevitably get exploited. Finding instances of such subtle relationships enhances situational awareness. Interestingly, insight into such patterns may also prove advantageous in system evaluation and troubleshooting when non-attack anomalies surface.

By addressing the challenges outlined above for reasoning about platform security using deep inspection of data at the application layer, machine learning can be a key enabler for cyber situational awareness. Use of machine learning is not exclusive to the application layer, however, and is useful at the lower protocol layers as well. For example, machine learning algorithms can learn the normal message schedule for the platform as a function of the different operating modes, establish normal electrical signal levels at the physical layer, to name a few. Moreover, these adaptive algorithms can help eliminate the need for tuning and tailoring of detection systems for each individual instance of the protected platform. Instead, they enable deployment of solutions applicable across an entire platform fleet. According to some embodiments, the anomaly detection includes multiple anomaly detectors, each trained to identify different types of anomalous behavior in the bus traffic (e.g., each detector may sense anomalies in a different level of the network).

According to one or more embodiments, the anomaly detecting circuit 420 is built through an iterative process of machine learning to train an algorithm that ingests representative data of the network platform for which the CWR is to defend against cyberattacks, extracts features from the representative data, and builds representations of expected behavior from the extracted features. For example, in some embodiments, bus data recorded during field trials of the target platform is used to do the initial training of the anomaly detection algorithm. This can include positive bus traffic samples (e.g., good data acquired from an uncompromised system) as well as negative bus traffic samples (e.g., data that has been specifically corrupted to represent a bad state, to further train or verify the anomaly detectors to recognize bad states in addition to good states). Then, the anomaly detecting circuit 420 is built based on the initially trained algorithm. At this point, further field trials are performed and bus data logged as anomalous behavior by the anomaly detecting circuit 420 is analyzed (for example, by a subject matter expert) to determine if behavior is anomalous or instead a false positive by the anomaly detecting circuit 420. In other embodiments, the logged anomalous bus data is assumed to be false positives (under the assumption that the field trials are operating in a normal, uncompromised state).

Further training of the anomaly detection algorithm can be performed, such as with the false positive data, all of the recently acquired bus data, or further acquired bus data (to name a few techniques) to better train the anomaly detection algorithm to identify bus data as either normal (e.g., matching the characteristics of previously acquired bus data under normal operating conditions) or anomalous (e.g., not matching the characteristics of previously acquired bus data under normal operating conditions). Such further training can be repeated through the above process until the rate of false positive data (or presumed false positive data) is reduced to an acceptable level (e.g., sufficiently low that the burden placed on experts to analyze the bus data identified as anomalous is acceptable, or within their capabilities). However, further processing of the anomalous data, such as through data fusion, may be needed to address the false positive data that is identified by the anomaly detecting circuit 420 regardless of how much training it is subjected to. Through data fusion, the anomalous data can be further identified as normal (e.g., harmless) or abnormal (e.g., possible cyberattack, to data to be concerned with).

In one or more embodiments of the present disclosure, additional training data is acquired during the mission cycle for a given platform. Because such cycles are likely to expose the platform to still more normal behavior, using recordings of bus traffic collected post mission would support incremental updates to training sets and learned behavior models. Distributing new models across different platform instances at regular intervals enables all protected platforms to benefit continuously from learning over collective data. In some embodiments, any of the newly acquired bus data that is identified as anomalous could be verified to be false positive data (e.g., by an expert analyst) prior to the further training (e.g., to help prevent the anomaly detection algorithm from being trained to recognize bus data from compromised systems as appearing to be coming from normal systems). With more data and collective knowledge, the performance of these machine learning based systems would continue to improve, providing a defense system that evolves with new threats, and adapts to defeat them.

As mentioned above not every anomaly means the platform is under attack (e.g., some behaviors identified as anomalous can simply be false positives). Systems are regularly entering and exiting new states and scenarios and experiencing abnormal conditions (e.g., situations whose corresponding bus data has not been recorded and used to train the anomaly detection algorithm before) resulting from a range of incidental activities or failure modes. The key distinctions between false positives (e.g., system glitches, unencountered states from normal operation, and the like) and true positives (e.g., cyberattacks) are the correlations that exist between observations, and the story they tell. Any single cyberattack step would likely generate a set of measurable side effects and artifacts unlike any behavior encountered during normal (uncompromised) operation. Multiple such steps in sequence begin to form a picture of the current attacker presence and their objectives in a cyberattack. In contrast, single anomalous events are more likely a glitch, one-time phenomenon, or other false positive data.

One technique for addressing phenomena such as single anomalous events (and other false positive bus data) versus multiple anomalous events having similar characteristics (indicating a possible cyberattack) is to use a data fusion system (such as the data fusing circuit 430) to put these pieces together. Data fusion formulates the best possible estimate of the underlying system state based on observations, then determines the likelihood that any detected anomalies are caused by, for example, an underlying failure, an engagement in a scenario, an operating mode not previously characterized, or a cyberattack. As a precaution, and for proper post-mission analysis, any anomalous bus data (such as the raw bus data triggering the anomaly detecting circuit 420) can be captured and recorded (such as on the electronic storage device 470).

With data fusion, anomalous data from multiple anomaly sensors (e.g., at similar times) can be aggregated in groups, such as through a partially observable Markov decision process, to enhance confidence that such anomalous behavior as either normal (though anomalous, such as glitches or first-time occurrences of otherwise understood bus traffic) or abnormal (e.g., possible cyberattack, such as a group of unexplained anomalous bus traffic that does fit any previously identified bus traffic on an uncompromised system).

In some embodiments, the CWR is configured as a passive device, monitoring the system for malicious activity and alerting operators of anything suspicious, but never actively interacting with the network. For example, the CWR can be positioned within a system to enable monitoring of all applicable busses. This option provides a degree of safety from a regression test standpoint, and the likelihood of any performance impact of a CWR on critical mission activities is reduced or minimized.

In other embodiments, the CWR is configured as an active device, such as being positioned in-line with critical 1553 bus subsystems, prepared to take rapid and decisive action to stop cyberattacks in their tracks. Given that cyberattacks can happen in the blink of an eye, active defense may in some cases be the only reasonable way to stop an attack (such as an unforeseen attack) from occurring. However, such an inline device could be tricked by attackers into providing an inappropriate response, in effect becoming a part of the attack itself. Accordingly, in some embodiments, design precautions are taken to ensure that attack suppression actions delivered by an inline CWR could not create consequences beyond what the original cyberattack would have achieved by itself.

Given its role, and especially when considered as part of an active defense configuration, a CWR according to some embodiments might itself become an attractive target for adversaries. As part of the cyber security operations on a platform, attackers may make it a priority to disable or interfere with the CWR to enable their other objectives. As such, in some embodiments, the CWR includes security hardened hardware and software through an active security development lifecycle that includes regular software patching.

Modern weapons platforms continue to reach new heights of interconnectivity and software-defined automation. With these enhancements comes addressing the increasing cyber security risks. Evidence from the commercial and industrial sectors suggests that many of the access vectors and attack methods observed there also apply to military platforms, with consequences that are potentially much more severe. Despite this reality, many modern weapons system platforms currently operate without sufficient means of providing detailed situational awareness into their cyber security state. Accordingly, in one or more embodiments of the present disclosure, survivability equipment that can monitor platform networks for malicious activity are provided. Network monitoring enables near term capability to detect or prevent cyberattacks that are a very real threat today.

The MIL-STD-1553 bus is identified as a prime location for observing cyberattacks in progress. This bus is pervasive across both modern and legacy defense platforms, and forms the backbone for exchanges of commands, status, and data between operators and the critical subsystems essential to the function of a platform. A CWR according to an embodiment of the present disclosure can monitor this bus for a range of malicious activities and attack types. This includes attacks that are being carried out to exploit the 1553 bus itself, and also attacks that cause deviation from established system behavior norms for data traversing this bus. The CWR can measure the layers of the 1553 network-based platform over time and identify anomalous or malicious activity. The CWR can implement detectors from two categories: explicit detection rules defined by subject matter experts, and system behavior models derived using machine learning. Use of explicit detection rules enables monitoring of the 1553 physical and data link layers for anomalous activity that violates the 1553 standard, or does not agree with basic attributes of the known system configuration. The use of learned system behaviors enables, for example, deep inspection of messages traversing the 1553 interface to verify they are operating on schedule, that the expected correlations exist between various data fields, and that data ranges and rates of change are within their expected values.

Using such a CWR, when a cyberattack occurs, the observations and anomalies that result are collected by an anomaly detector and examined using a data fusion process. This process estimates the underlying security state of the platform and tracks attacker actions. When critical systems are involved or a survivability risk is identified, the CWR can alert operators. Cyber warning capabilities form a key addition to the suite of platform survivability equipment, providing visibility into the cyber domain and keeping systems safe in the face of this emerging advanced threat.

Figure 6:
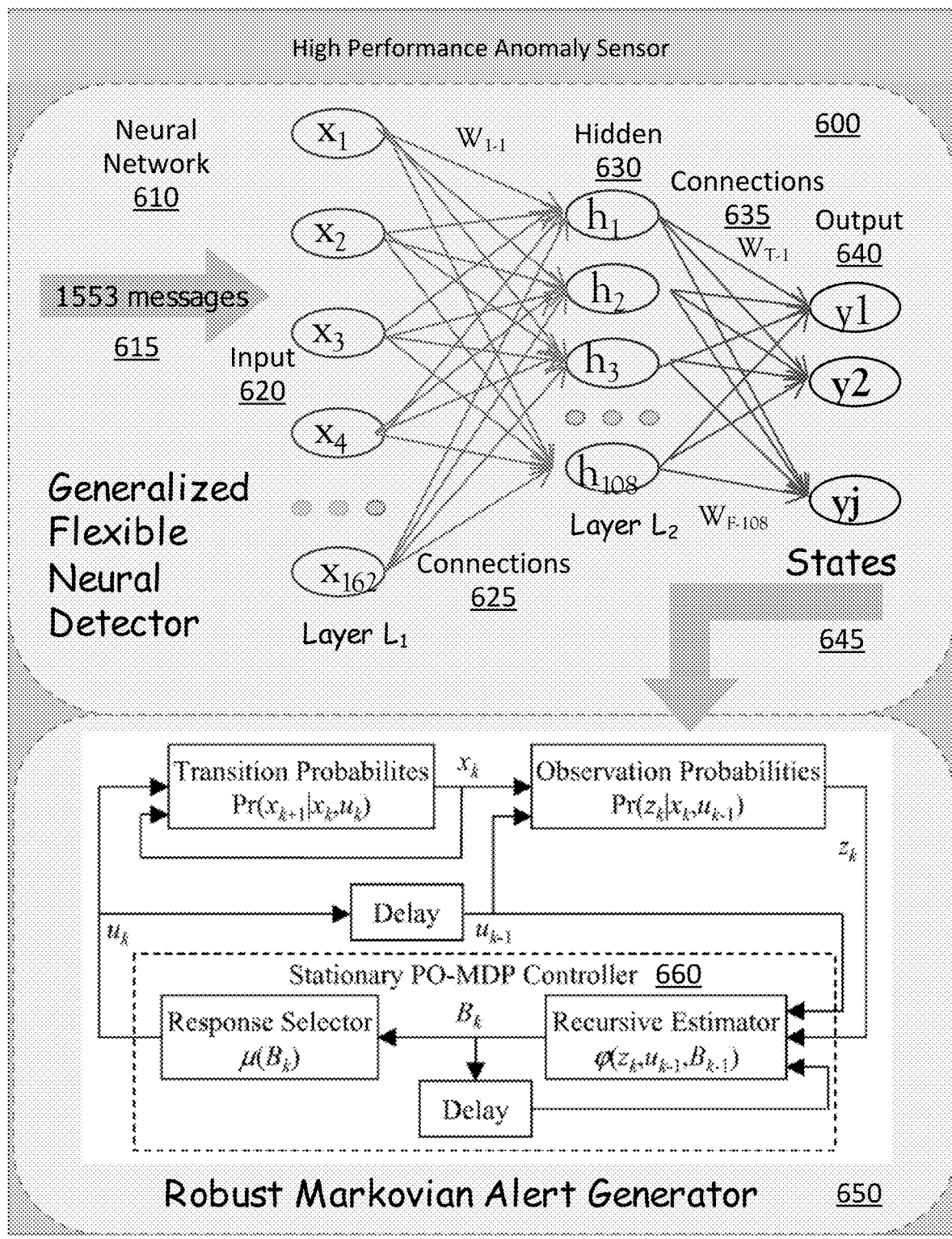
FIG. 6 is a schematic diagram illustrating an example neural network-based anomaly sensor for analyzing bus traffic and a partially observable Markov decision process (POMDP) based alert generator for deciding if the analyzed bus traffic is normal or abnormal, according to an embodiment of the present disclosure.

FIG. 6 is a schematic diagram illustrating an example neural network-based anomaly sensor 600 for analyzing bus traffic and a partially observable Markov decision process (POMDP) based alert generator 650 for deciding if the analyzed bus traffic is normal or abnormal, according to an embodiment of the present disclosure. The anomaly sensor 600 includes a neural network 610 for inputting bus traffic messages 615 (such as MIL-STD-1553 messages) at input nodes (or neurons) 620 that make up a first layer (or input layer) of the neural network 610. The inputted bus traffic (e.g., next bus traffic message) causes some of the input nodes 620 to fire, sending weighted signals down corresponding connections (or axions or synapses) 625 to hidden nodes 630 that make up a second layer (or hidden layer) of the neural network 610. The weighted signals in turn cause some of the hidden nodes 630 to fire, sending weighted signals down corresponding connections 635 to output nodes 640 that make up a third layer (or last layer or output layer) of the neural network 610. The weighted signals in turn cause some of the output nodes 640 to fire, generating a state 645 based on the particular output nodes 640 that fire.

The output state 645 is the useful information (e.g., classification, such as anomalous or not) returned by the neural network 610 based on the input bus traffic message 615. The neural network 610 can be trained to identify whether or not bus traffic messages exhibit anomalous behavior based on machine learning techniques that assign weights to the connections 625 and 635. During a training phase, neural network sensor connections learn subtle features of labeled message streams using machine learning. For example, during the training, only a few fields in the messages end up playing any critical role in distinguishing normal versus anomalous behavior. However, the neural network 610 learns which fields are critical with minimal human effort, based on the training data (e.g., normal bus traffic). While the anomaly sensor 600 shows only one neural network, in some embodiments, numerous neural networks 610 are present, each one trained to detect a different type of anomalous bus traffic. Accordingly, numerous states 645 can be generated from a single input message 615. In addition, while the neural network 610 shows only one layer of hidden nodes 730, in other embodiments, neural networks can include two or more layers of hidden nodes. Further to this, in other embodiments, alternative classifiers such as support vector machines can be applied in place of neural networks to accomplish the anomaly detection function.

The output states 645 from this input message 615 (or nearby input messages 615 or similar input messages 615) can be fused to bring together correlations of anomalous data that helps identify whether the anomalous data is normal bus traffic (but anomalous when each input message 615 or neural network state 645 is considered in isolation) or abnormal bus traffic (and thus potentially harmful, such as a cyberattack). The fused anomalous states can be input into the alert generator 650, which uses a POMDP based controller 660 to decide if the fused anomalous states represent normal or abnormal bus traffic. By integrating multiple detectors and samples to improve event confidence, the POMDP controller 660 uses a stochastic state transition decision-making process with reinforcement learning to identify which fused groups of anomalous behavior events represent normal bus traffic and which represent abnormal (and possibly dangerous) bus traffic. The alert generator 650 then alerts an operator of the 1553 network based platform of any fused anomalous behavior identified by the POMDP controller 660 as abnormal.

Figure 7:
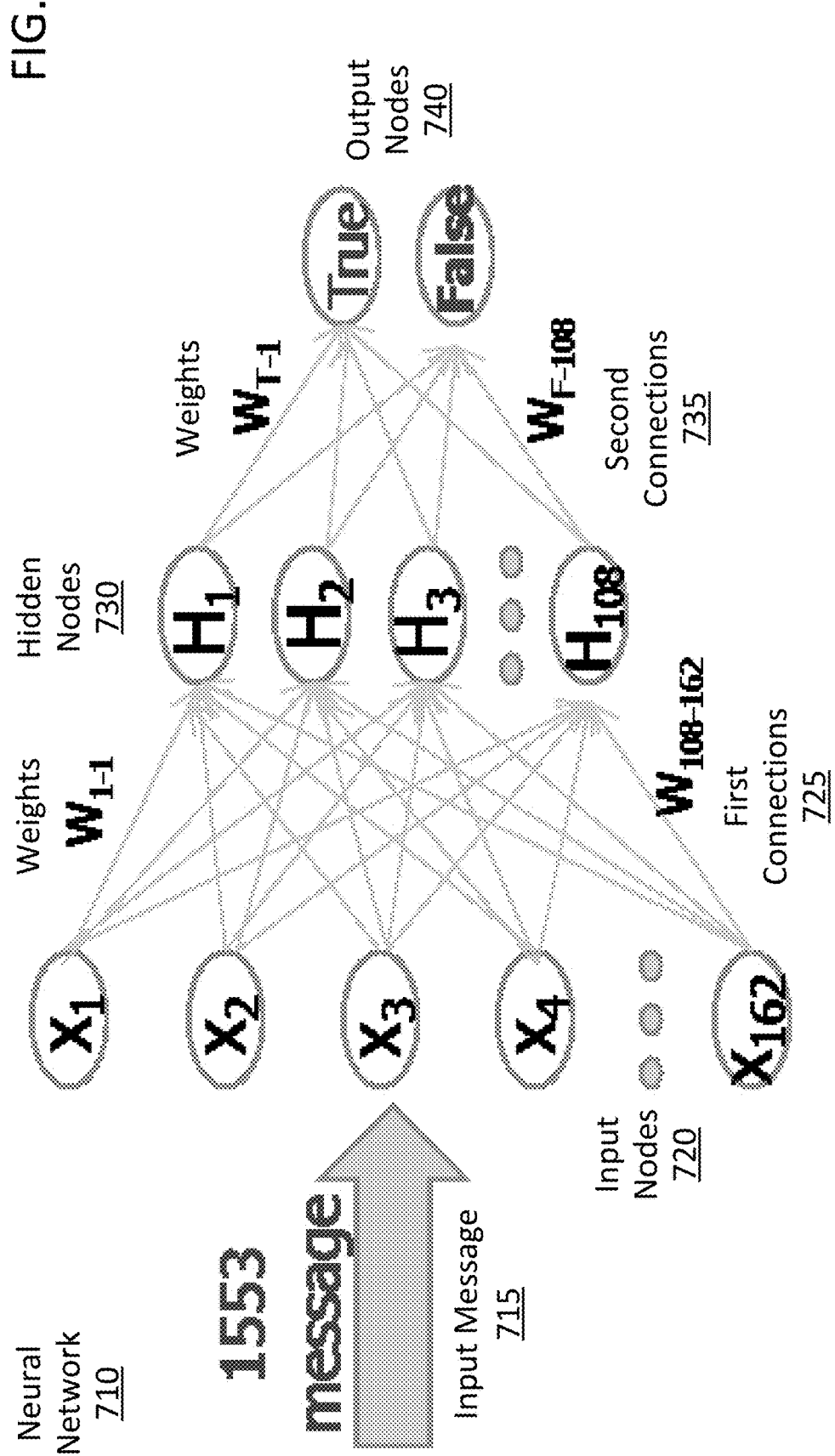
FIG. 7 is a schematic diagram illustrating an example neural network for analyzing bus traffic, according to an embodiment of the present disclosure.

FIG. 7 is a schematic diagram illustrating an example neural network 710 for analyzing bus traffic, according to an embodiment of the present disclosure. The neural network 710 can be used, for example, as a CWR neural network sensor. The neural network 710 inputs embedded bus traffic messages 715 (such as MIL-STD-1553 messages) at input nodes 720. In response to the input message 715, some of the input nodes 720 fire, sending weighted signals down corresponding first connections 725 to hidden nodes 730. The weighted signals in turn cause some of the hidden nodes 730 to fire, sending weighted signals down corresponding second connections 735 to output nodes 740.

The neural network 710 is an example of a feedforward neural network (e.g., processing moves in one direction from inputs to outputs and without any feedback). For example, each input node 720 in the input layer can represent a different corresponding byte of a fixed length message (in this case, N =162 input nodes for a 162-byte message, as might be used in a message packet in a 1553 network). The output layer includes two output nodes 740, representing true and false (such as anomalous or not). The hidden layer has (N×2)/3=108 hidden nodes (i.e., two-thirds the number of input nodes), but this is only an example, and other embodiments are not so limited. For example, the number of hidden nodes could be two-thirds times the number of input and output nodes. Training the neural network 710 generally refers to finding the best weights that can classify the incoming messages 715. In more detail, training the neural network 710 includes presenting the neural network training data and then using machine learning techniques such as stochastic gradient descent and backpropagation to determine the weights of the corresponding first and second connections 725 and 735 so that the neural network correctly identifies (e.g., classifies) the incoming messages as anomalous or not. The neural network 710 may be a simple network (e.g., looking for only one type of anomaly), so a single hidden layer may suffice. In general, increasing the number of hidden layers makes the neural network more adaptable and trainable, but if the task of the neural network is simple enough, more hidden layers will not improve the accuracy of the neural network.

In some embodiments, there are two sets of training data: positive and negative. The positive training data set includes messages encountered during normal (e.g., uncompromised) behavior of the avionics platform. The neural network should identify these messages as not being anomalous. The negative training data set, on the other hand, includes messages that represent invalid, compromised, or otherwise inconsistent states. The neural network should identify these messages as being anomalous. Negative training data may be obtained, for example, by deliberately corrupting positive training data, or collecting messages while artificially forcing a bad state (e.g., having a sensor indicate that an aircraft has landed when in fact the aircraft is flying), or by supplying data collected during real cyberattacks on an actual platform., or the like. The positive and negative data sets can each be divided into two subsets, with, for example, two-thirds of the messages being used for training and the other third of the messages being used for validating. Since the positive training data set may be relatively large (can include all bus messages sensed during normal operations) while the negative training data sets may be relatively small (e.g., requires special processing or circumstances to generate), the negative training data set can have its messages replicated so that its size is comparable to that of the positive training data set.

In one or more embodiments, training and validating the neural network includes a training session of about 100 epochs using stochastic gradient descent. The stochastic gradient descent randomly selects, for example, batches of 30 messages out of the training data sets. A cost function can then be computed to minimize errors (e.g., producing the opposite answers from what was expected) for each batch and collectively for the entire training sets. For a simple network, the system may saturate at around 30 epochs (e.g., the accuracy reaches its best level, such as around 95-100% correct) during the training session. Then a validation session uses the validating data sets to predict the outcome (using the trained neural network) versus the predefined labels (e.g., positive or negative) assigned to each of the validating messages.

For an example embedded bus environment, there may be some number (e.g., 12) different message types that make up the bus traffic. However, a given anomaly may only be present in one of these message types. Accordingly, in one or more embodiments, inputs from all 12 message types are provided in the training and validating data sets to the neural network being trained to identify the anomaly. This makes the neural network more generic, as it is able to address all the different message types even when it is looking for a specific anomaly in one of the message types.

Figure 8:
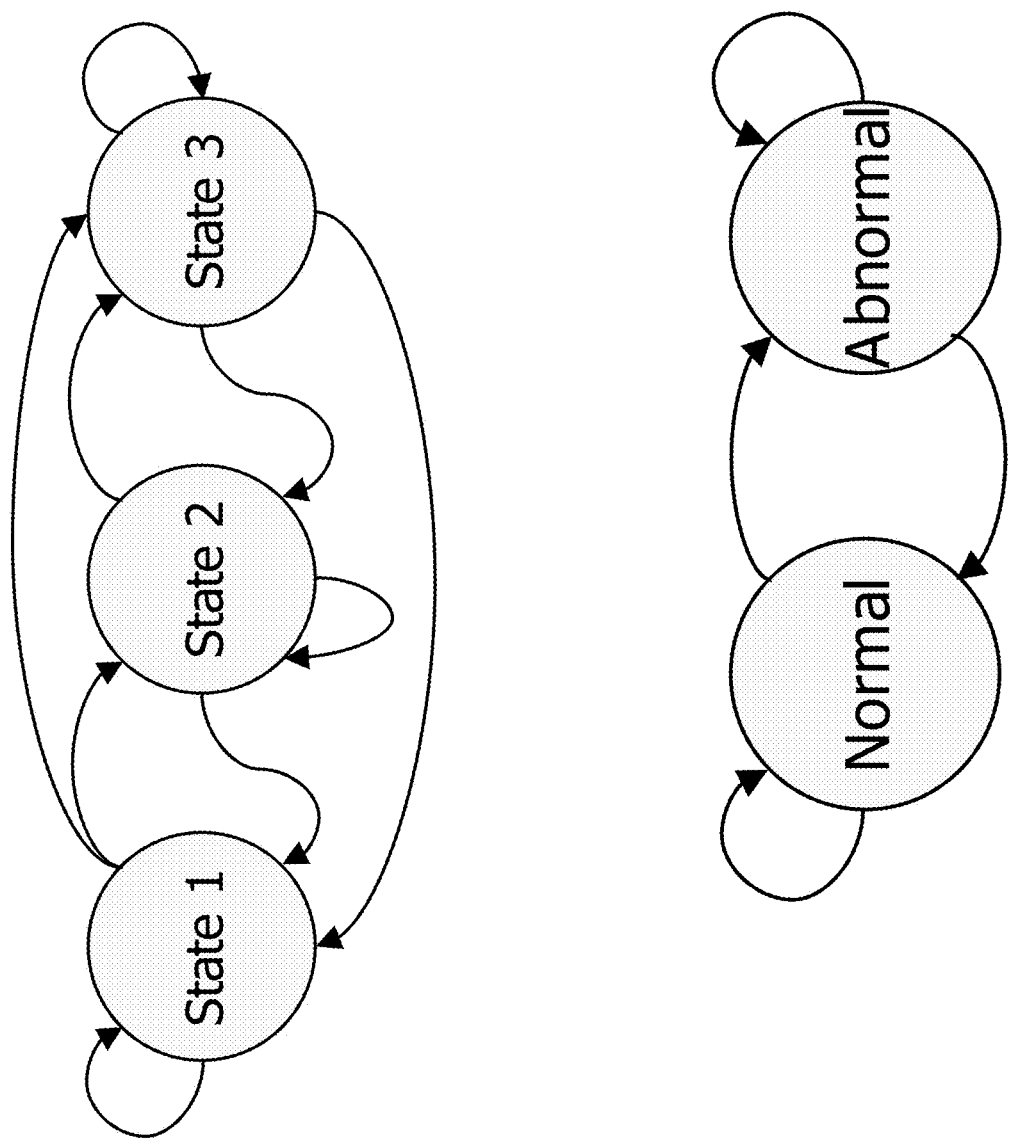
FIG. 8 is a schematic diagram illustrating a general POMDP and an example POMDP in accordance with an embodiment of the present disclosure.

FIG. 8 is a schematic diagram illustrating a general POMDP 810 and a POMDP 820 in accordance with an embodiment of the present disclosure. As noted earlier, POMDP stands for partially observable Markov decision process. A POMDP is partially observable in that the sensors reveal some information about what the current state or states are, but there is no certainty in this determination. In addition, a POMDP is Markov in that the model satisfies the Markovian property: the state of the system at time k depends only on the state at time k-1 and observations at time k. Further, a POMDP is a decision process in that it uses the estimate of the condition of the system to make a decision about what action to take. A POMDP follows a state model in that the condition of the system is modeled by a set of states. However, the system is not "in a state" in the sense that the system is in one such state at any given time. Rather, the "state" of the system is a probability distribution across the possible states. A POMDP can be characterized by three parameters, namely a transition matrix P, an observation matrix H, and a cost matrix G.

Figure 9:
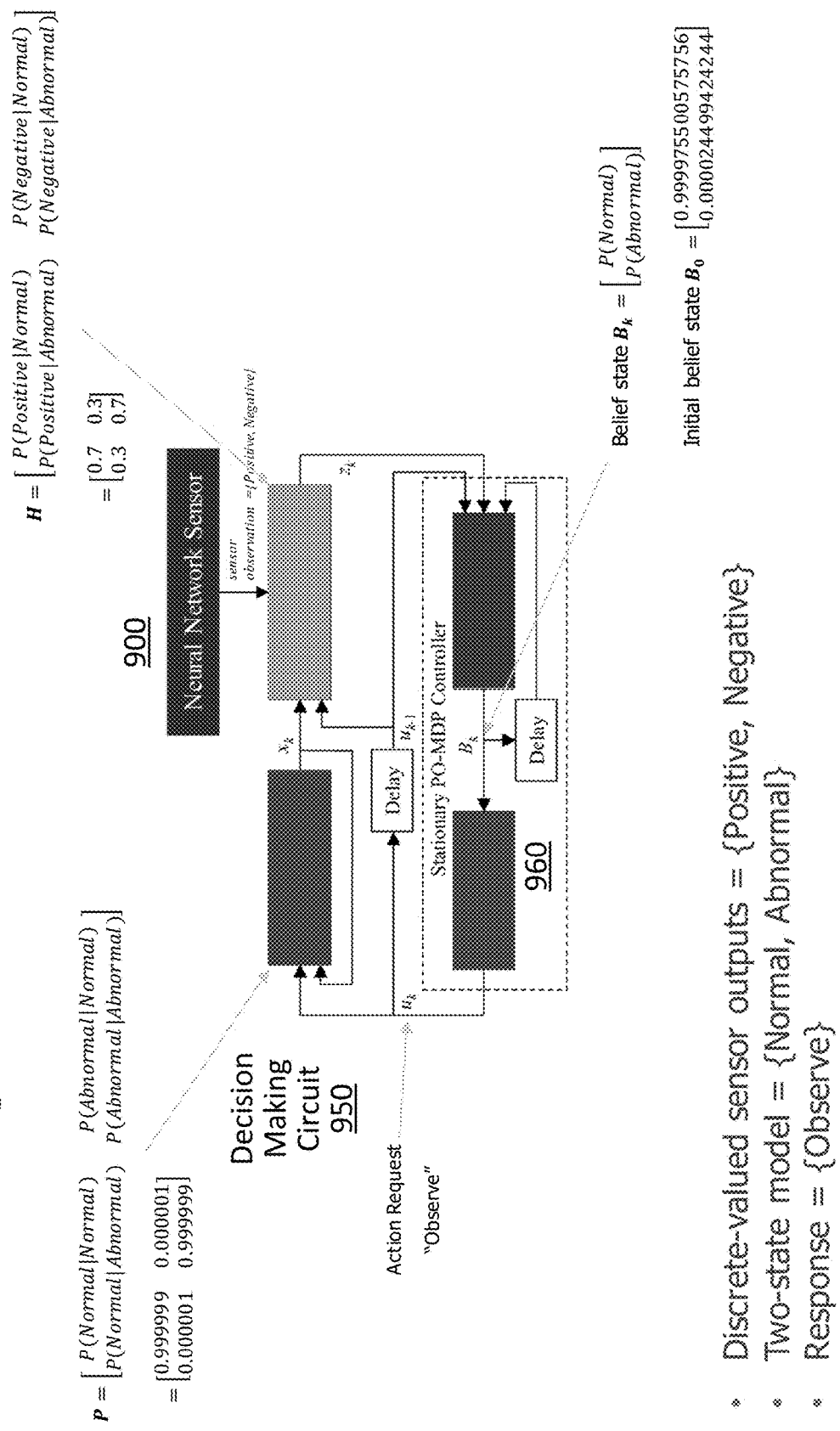
FIG. 9 is a schematic diagram illustrating an example POMDP for deciding if anomalous bus traffic data is normal or abnormal, according to an embodiment of the present disclosure.
Figure 10:
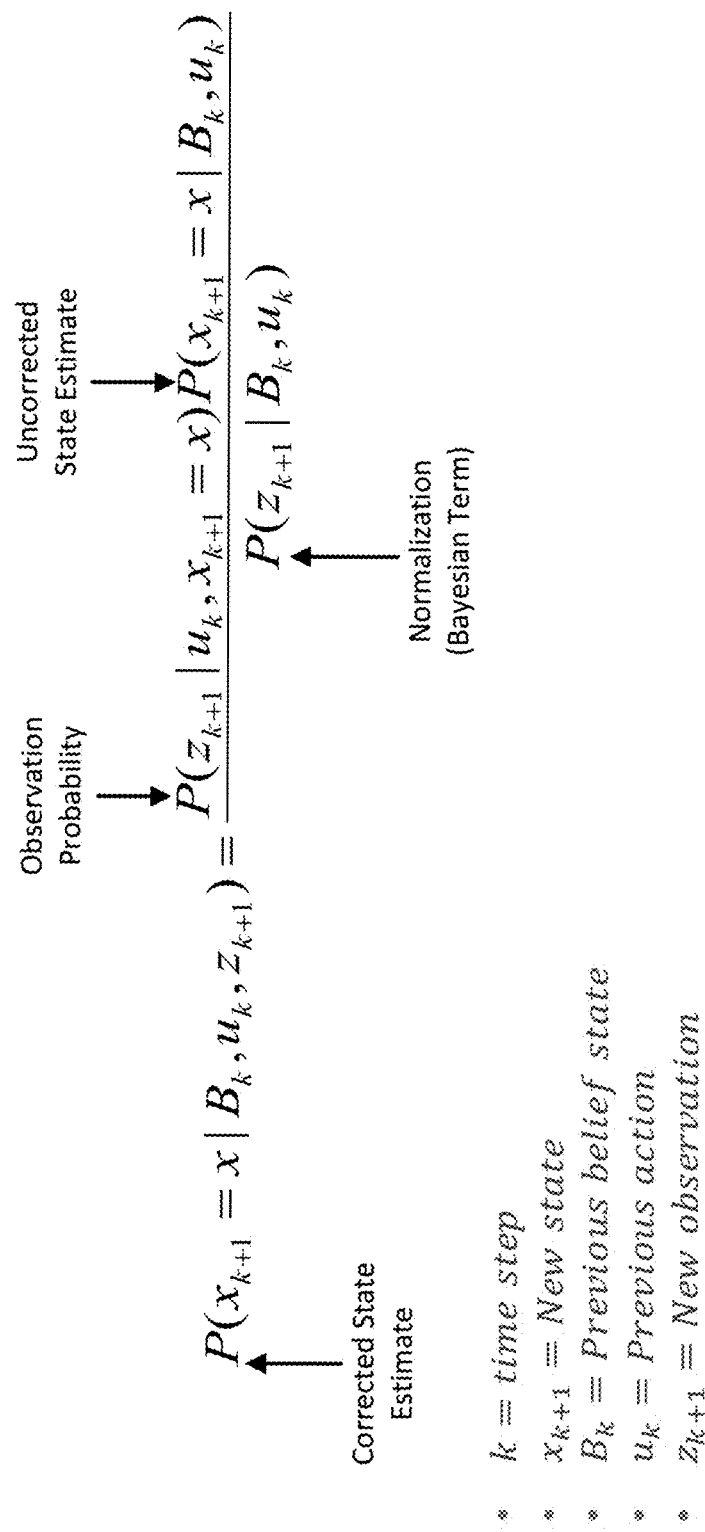
FIG. 10 is a diagram illustrating an example Bayesian recursive estimator for use with a POMDP in accordance with an embodiment of the present disclosure.

FIG. 9 is a schematic diagram illustrating an example POMDP 950 for deciding if anomalous bus traffic data is normal or abnormal, according to an embodiment of the present disclosure. FIG. 10 is a diagram illustrating an example Bayesian Recursive Estimator for use with a POMDP in accordance with an embodiment of the present disclosure. The decision making circuit 950 includes a POMDP controller 960 to decide if the output from a neural network sensor 900 (trained to identify anomalous bus traffic) is normal bus traffic data or abnormal bus traffic data. The POMDP controller includes a Recursive Estimator and a Response Selector. In further detail, at each stage, the Recursive Estimator takes an observation $z_k$, the last corrected state estimate $B_{k-1}$, and the last action that was taken, $u_{k-1}$. This produces a new corrected state estimate $B_k$, which is used by the Response Selector to produce a new action $U_k$.

For the POMDP based decision making circuit 950 of FIG. 9, the neural network sensor 900 is assumed to classify bus traffic messages as anomalous or not, while the POMDP takes on one of two states, normal or abnormal. In addition, different actions are not utilized in the POMDP, rather there is a single action "observe."

Further Example Embodiments

The following examples pertain to further embodiments, from which numerous permutations and configurations will be apparent.

Example 1 is a cyber warning receiver (CWR). The CWR includes a bus sensing circuit to sense traffic on a communications bus over time, an anomaly detecting circuit to detect anomalous behavior in the sensed bus traffic, a data fusing circuit to fuse the detected anomalous behavior into groups having similar characteristics, a decision making circuit to decide if the fused anomalous behavior is normal or abnormal, and a behavior logging circuit to log the detected anomalous behavior on an electronic storage device.

Example 2 includes the subject matter of Example 1. The CWR further includes a behavior alerting circuit to alert an operator to the fused anomalous behavior identified as abnormal.

Example 3 includes the subject matter of Example 2. In addition, the behavior alerting circuit is configured to not alert the operator to the fused anomalous behavior identified as normal.

Example 4 includes the subject matter of Example 1. In addition, the communications bus is an embedded communications bus.

Example 5 includes the subject matter of Example 4. In addition, the embedded communications bus is a MIL-STD-1553 bus.

Example 6 includes the subject matter of Example 5. In addition, the CWR is a standalone device configured to connect to the MIL-STD-1553 bus as a bus monitor.

Example 7 includes the subject matter of Example 1. In addition, the anomaly detecting circuit includes a plurality of anomaly detecting circuits configured to detect a corresponding plurality of different anomalous behavior in the sensed bus traffic.

Example 8 includes the subject matter of Example 1. In addition, the anomaly detecting circuit is a neural network trained to detect the anomalous behavior in the sensed bus traffic.

Example 9 includes the subject matter of Example 1. In addition, the data fusing circuit is configured to fuse the detected anomalous behavior into groups having similar sensing times in their corresponding sensed bus traffic.

Example 10 includes the subject matter of Example 1. In addition, the decision making circuit uses a partially observable Markov decision process (POMDP) to decide if the fused anomalous behavior is normal or abnormal.

Example 11 is a computer-implemented method of cyber warning. The method includes: sensing, by a processor, traffic on a communications bus over time; detecting, by the processor, anomalous behavior in the sensed bus traffic; fusing, by the processor, the detected anomalous behavior into groups having similar characteristics; deciding, by the processor, if the fused anomalous behavior is normal or abnormal; and logging, by the processor, the detected anomalous behavior on an electronic storage device.

Example 12 includes the subject matter of Example 11. In addition, the method further includes alerting, by the processor, an operator to the fused anomalous behavior identified as abnormal.

Example 13 includes the subject matter of Example 12. In addition, the method further includes not alerting, by the processor, the operator to the fused anomalous behavior identified as normal.

Example 14 includes the subject matter of Example 11. In addition, the fusing includes fusing the detected anomalous behavior into groups having similar sensing times in their corresponding said sensed bus traffic.

Example 15 includes the subject matter of Example 11. In addition, the deciding includes using a partially observable Markov decision process (POMDP) to decide if the fused anomalous behavior is normal or abnormal.

Example 16 is a computer program product including one or more non-transitory machine-readable mediums encoded with instructions that when executed by one or more processors, cause a computer-implemented process to be carried out for cyber warning. The process includes sensing traffic on a communications bus over time, detecting anomalous behavior in the sensed bus traffic, fusing the detected anomalous behavior into groups having similar characteristics, deciding if the fused anomalous behavior is normal or abnormal, and logging the detected anomalous behavior on an electronic storage device.

Example 17 includes the subject matter of Example 16. In addition, the process further includes alerting an operator to the fused anomalous behavior identified as abnormal.

Example 18 includes the subject matter of Example 17. In addition, the process further includes not alerting the operator to the fused anomalous behavior identified as normal.

Example 19 includes the subject matter of Example 16. In addition, the fusing includes fusing the detected anomalous behavior into groups having similar sensing times in their corresponding said sensed bus traffic.

Example 20 includes the subject matter of Example 16. In addition, the deciding includes using a partially observable Markov decision process (POMDP) to decide if the fused anomalous behavior is normal or abnormal.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. In addition, various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A cyber warning receiver (CWR) comprising:
a bus sensing circuit to sense traffic on a vehicle communications bus over time, and passively monitors the traffic on the vehicle communications bus but does not receive the traffic, wherein the vehicle communications bus is an embedded serial bus or optical bus;
an anomaly detecting circuit comprising a plurality of anomaly detectors to detect anomalous behavior, wherein the anomaly detectors employ a first neural network trained to identify and detect anomalous behavior in the sensed bus traffic, and wherein the anomaly detectors employ rules with characteristics of the vehicle communications bus;
a data fusing engine to fuse the detected anomalous behavior of the sensed bus traffic into groups having similar characteristics that share common temporal or behavioral patterns, wherein the data fusing engine applies non-parametric learning to produce fused detected anomalous behavior;
a decision making circuit, wherein the decision making circuit is a second neural network trained using both the anomalous behavior and the fused detected anomalous behavior to decide if there is a cyberattack, wherein the decision making circuit uses a partially observable Markov decisions process (POMDP); and
a behavior logging circuit to log the detected anomalous behavior on an electronic storage device and providing real-time cyberattack notification,
wherein the cyber warning receiver is a standalone device configured to connect to the vehicle communications bus as a bus monitor.

2. The CWR of claim 1, further comprising a behavior alerting circuit to alert an operator to the fused detected anomalous behavior identified as abnormal.

3. The CWR of claim 2, wherein the behavior alerting circuit is configured to not alert the operator to the fused detected anomalous behavior identified as normal.

4. The CWR of claim 1, wherein the vehicle communications bus is a MIL-STD-1553 bus.

5. The CWR of claim 4, wherein the CWR is a configured to connect to the MIL-STD-1553 bus.

6. The CWR of claim 1, wherein the anomaly detecting detectors are configured to detect a corresponding plurality of different anomalous behavior in the sensed bus traffic.

7. The CWR of claim 1, wherein the data fusing circuit is configured to fuse the detected anomalous behavior into groups having similar sensing times in their corresponding sensed bus traffic.

8. The CWR of claim 1, wherein the CWR employs training periods that characterizes traffic patterns and models a range of normal system behaviors to establish the groups having similar characteristics.

9. A computer-implemented method of cyber warning, the method comprising:
- sensing, by a bus sensing circuit, traffic on a vehicle communications bus over time and passively monitoring the traffic on the vehicle communications bus but does not receive the traffic, wherein the vehicle communications bus is an embedded serial bus or optical bus;
- detecting, by an anomaly detecting circuit comprising a plurality of anomaly detectors to detect anomalous behavior in the sensed bus traffic, wherein a first neural network is trained to identify and detect the anomalous behavior in the sensed bus traffic, and wherein the anomaly detectors employ rules with characteristics of the vehicle communications bus;
- fusing, by a data fusing engine, the detected anomalous behavior of the sensed bus traffic into groups having similar characteristics that share common temporal or behavioral patterns, wherein the data fusing engine applies non-parametric learning to produce fused detected anomalous behavior;
- deciding, by a decision making circuit, if the fused detected anomalous behavior is normal or abnormal, wherein the decision making circuit is a second neural network independent of the first neural network and is trained using both the anomalous behavior and the fused detected anomalous behavior to decide if there is a cyberattack, and wherein the decision making circuit uses a partially observable Markov decisions process (POMDP); and
- logging, by a behavior logging circuit, the detected anomalous behavior on an electronic storage device and providing real-time cyberattack notification,
- wherein the cyber warning receiver is a standalone device configured to connect to the vehicle communications bus as a bus monitor.

10. The method of claim 9, further comprising alerting, by, a behavior alerting circuit, an operator to the fused detected anomalous behavior identified as abnormal.

11. The method of claim 10, further comprising not alerting, by the, behavior alerting circuit, the operator to the fused detected anomalous behavior identified as normal.

12. The method of claim 11, wherein the fusing comprises fusing the detected anomalous behavior into groups having similar sensing times in their corresponding sensed bus traffic.

13. A computer program product including one or more non-transitory machine-readable mediums encoded with instructions that when executed by one or more processors of a cyber warning receiver, cause a computer-implemented process to be carried out for cyber warning, the process comprising:
- sensing, by a bus sensing circuit, traffic on a vehicle communications bus over time and passively monitoring the traffic on the vehicle communications bus but does not receive the traffic, wherein the vehicle communications bus is an embedded serial bus or optical bus;
- detecting, by an anomaly detecting circuit comprising a plurality of anomaly detectors to detect anomalous behavior in the sensed bus traffic, wherein a first neural network is trained to identify and detect the anomalous behavior in the sensed bus traffic, and wherein the anomaly detectors employ rules with characteristics of the vehicle communications bus;
- fusing, by a data fusing engine, the detected anomalous behavior of the sensed bus traffic into groups having similar characteristics that share common temporal or behavioral patterns, wherein the data fusing engine applies non-parametric learning to produce fused detected anomalous behavior;
- deciding, by a decision making circuit, if the fused detected anomalous behavior is normal or abnormal, wherein a second neural network independent of the first neural network and is trained using both the anomalous behavior and the fused detected anomalous behavior to decide if there is a cyberattack, and wherein the decision making circuit uses a partially observable Markov decisions process (POMDP); and
- logging, by a behavior logging circuit, the fused detected anomalous behavior on an electronic storage device and providing real-time cyberattack notification,
- wherein the cyber warning receiver is a standalone device configured to connect to the vehicle communications bus as a bus monitor.

14. The computer program product of claim 13, wherein the process further comprises alerting an operator to the fused detected anomalous behavior identified as abnormal.

15. The computer program product of claim 14, wherein the process further comprises not alerting the operator to the fused detected anomalous behavior identified as normal.

16. The computer program product of claim 13, wherein the fusing comprises fusing the detected anomalous behavior into groups having similar sensing times in their corresponding sensed bus traffic.

* * * * *